United States Patent [19]
Mori et al.

[11] Patent Number: 5,589,143
[45] Date of Patent: Dec. 31, 1996

[54] EXHAUST GAS PURIFICATION APPARATUS FOR INTERNAL COMBUSTION ENGINE

[75] Inventors: Hiroshi Mori, Ichinomiya; Masakazu Tanaka, Okazaki; Mamoru Mabuchi, Kariya; Makoto Saito, Nishio, all of Japan

[73] Assignee: Nippondenso Co., Ltd., Kariya, Japan

[21] Appl. No.: 434,320

[22] Filed: May 2, 1995

Related U.S. Application Data

[63] Continuation of Ser. No. 120,384, Sep. 14, 1993, abandoned.

[30] Foreign Application Priority Data

Sep. 16, 1992 [JP] Japan .................... 4-246903
Feb. 4, 1993 [JP] Japan .................... 5-040501
Feb. 25, 1993 [JP] Japan .................... 5-061036

[51] Int. Cl.$^6$ .............................. B01D 50/00; F01N 3/28
[52] U.S. Cl. ................. 422/171; 422/169; 422/168; 60/297
[58] Field of Search ................... 422/169, 170–173; 60/297, 288, 274; 423/213.5, 213.7

[56] References Cited

U.S. PATENT DOCUMENTS

| | | | |
|---|---|---|---|
| 3,645,098 | 2/1972 | Tomplin et al. | 60/297 |
| 3,657,892 | 4/1972 | Perga et al. | 60/274 |
| 3,699,683 | 10/1972 | Tourtellotte et al. | 60/274 |
| 3,813,226 | 5/1974 | Heitland et al. | 422/171 |
| 3,892,536 | 7/1975 | Roeser et al. | 422/169 |
| 4,934,142 | 6/1990 | Hayashi et al. | 60/297 |
| 4,985,210 | 1/1991 | Minami | 422/169 |
| 5,051,244 | 9/1991 | Dunne et al. | 423/213.5 |
| 5,125,231 | 6/1992 | Patil et al. | 60/274 |
| 5,140,811 | 8/1992 | Minami et al. | 60/297 |
| 5,142,864 | 9/1992 | Dunne | 60/274 |
| 5,158,753 | 10/1992 | Take et al. | 422/173 |

FOREIGN PATENT DOCUMENTS

| | | |
|---|---|---|
| 318462 | 5/1989 | European Pat. Off. . |
| 378797 | 7/1990 | European Pat. Off. . |
| 422432 | 4/1991 | European Pat. Off. . |
| 460542 | 12/1991 | European Pat. Off. . |
| 0485179 | 5/1992 | European Pat. Off. . |
| 3627637 | 10/1987 | Germany . |
| 4113293 | 4/1992 | Germany . |
| 5413815 | 2/1979 | Japan . |
| 2-86910 | 3/1990 | Japan . |
| 2075327 | 3/1990 | Japan . |
| 2135126 | 5/1990 | Japan . |
| 3141816 | 6/1991 | Japan . |
| 3194113 | 8/1991 | Japan . |
| 4017710 | 1/1992 | Japan . |
| 4311618 | 11/1992 | Japan . |
| 5-44446 | 2/1993 | Japan . |
| 5-57138 | 3/1993 | Japan . |
| 5149131 | 6/1993 | Japan . |
| 60-93850 | 4/1994 | Japan . |

OTHER PUBLICATIONS

Patent Abstract of Japan, vol. 11, No. 397(M655), Dec. 1987 re JP–A 62162715.

Patent Abstract of Japan, vol. 12, No. 039(M665), Feb. 1988 re JP–A 62191609.

SAE Technical Paper Series #920847, "Cold–start Hydrocarbon Collection for advanced exhaust Emission control", Martin J. Heimrich et al, 1992.

*Primary Examiner*—Robert J. Warden
*Assistant Examiner*—Hien Tran
*Attorney, Agent, or Firm*—Cushman, Darby & Cushman

[57] ABSTRACT

An exhaust gas purification apparatus has a catalyst unit provided in an exhaust pipe of an engine and an absorbent provided downstream of the catalyst unit. When the engine is in a cool state, HC emitted from the engine is absorbed by the absorbent. After the engine is warmed up, the absorbed HC is desorbed by heat of an exhaust gas and returned to an upstream side of the catalyst unit the HC by heat of an exhaust gas.

5 Claims, 16 Drawing Sheets

EXHAUST GAS PURIFICATION APPARATUS FOR INTERNAL COMBUSTION ENGINE

This is a continuation of application Ser. No. 08/120,384, filed on Sep. 14, 1993, now abandoned.

BACKGROUND OF THE INVENTION

1. Field of the Invention

The present invention relates to an exhaust gas purification apparatus for an internal combustion engine.

2. Description of the Related Art

An automobile includes, for example, a monolith type catalyst provided in an exhaust pipe to purify and discharge an exhaust gas from an engine to the atmosphere. This catalyst purifies the exhaust gas by oxidizing HC and CO in the exhaust gas or reducing NOx therein.

Incidentally, when an exhaust gas is purified only by the aforesaid catalyst, if the exhaust gas is at a low temperature as in such a case, for example, that an engine is started at a low temperature, the catalyst is not activated, and thus a drawback arises in that uncombusted hydrocarbon (HC) passes through the catalyst and discharged to the atmosphere.

To cope with this drawback, Japanese Patent Unexamined Publication Nos. 3-141816, 4-17710 and the like disclose an exhaust gas purification apparatus having an HC absorbent disposed on the upstream side of a catalyst provided in the exhaust pipe of an engine to capture uncombusted hydrocarbon (HC) exhausted from the engine when it starts at a low temperature.

Incidentally, in Japanese Patent Unexamined Publication No. 3-141816, when an exhaust gas is at a temperature less than 200° C., HC is absorbed by the absorbent, whereas when the exhaust gas is at a temperature exceeding 200° C., absorbed HC desorbs therefrom on the contrary. Thus, a problem arises in that when a catalyst disposed on the downstream side of the absorbent is not activated, the HC passes through the catalyst and is discharged to the atmosphere. Therefore, there are provided a bypass pipe for bypassing the absorbent and a change-over valve provided at the inlet of the bypass pipe. When an exhaust gas is at a temperature of 250° C. or lower, the bypass pipe is closed to conduct the exhaust gas to the absorbent to enable the same to be absorbed by the absorbent, and when the exhaust gas is at a temperature exceeding 250° C., the bypass pipe is opened to check the flow of the exhaust gas to the absorbent and prevent the desorption of the HC absorbed by the absorbent. Further, when the exhaust gas exceeds 300° C., the bypass pipe is closed to conduct the exhaust gas to the absorbent to desorb the HC and the desorbed HC is purified by the catalyst located on the downstream side.

As described above, a problem arises in that the change-over valve for opening/closing the bypass pipe must be controlled in a narrow temperature range from 250° C. to 300° C.

Further, when the temperature of the absorbent is increased by the heat conduction through the exhaust pipe in the state that the bypass pipe is closed and HC is desorbed, if the catalyst located on the downstream side is not activated, a problem arises in that the HC passes through the catalyst and discharged to the atmosphere in a large amount.

SUMMARY OF THE INVENTION

An object of the present invention is to provide an exhaust gas purification apparatus for an internal combustion engine in which valves need not be opened/closed in a narrow temperature range and further absorbed HC can be quickly desorbed.

Another object of the present invention is to provide an automobile exhaust gas purification apparatus in which HC can be absorbed by an absorbent and then desorbed and purified with a simple and less expensive structure.

A further object of the present invention is to provide an exhaust gas purification apparatus in which the emission of harmful components in an exhaust gas, in particular, the emission of HC can be prevented even when an engine is in a cool state, the HC absorbed by an absorbent is effectively desorbed and returned to a catalyst unit when the engine is warmed up, and an adverse effect on the engine caused by the circulation of HC is minimized as far as possible.

To achieve the above objects, the present invention provides an exhaust gas purification apparatus for an internal combustion engine, which comprises a catalyst unit provided in an exhaust pipe of the engine; an absorbent provided on the downstream side of the catalyst unit; and means for exposing components absorbed by the absorbent to heat of an exhaust gas to desorb the components from the absorbent.

The present invention further provides an exhaust gas purification apparatus for an internal combustion engine, which comprises a bypass pipe for bypassing a portion of an exhaust pipe provided on the downstream side of a catalyst unit which is provided in the exhaust pipe of the engine; an absorption tube provided on the bypass pipe and filled with an absorbent; a first change-over valve provided at a location where the bypass pipe branches from the exhaust pipe for changing over the flow of an exhaust gas; a second change-over valve provided at a location where the bypass pipe joins the exhaust pipe for changing over the flow of the exhaust gas; a circulation path for connecting a position downstream of the absorption tube to a position upstream of the catalyst unit; a one-way valve provided in the circulation path for permitting a gas to flow only from the absorption tube to the catalyst unit; and control means for opening the first and second change-over valves when the engine is in a cool state to introduce the exhaust gas into the bypass pipe, closing the first and second change-over valves when the engine is warmed up, and slightly opening the first change-over valve each time the exhaust pipe is at a negative pressure to return desorbed HC to the upstream side of the catalyst unit through the circulation path.

The present invention further provides an exhaust gas purification apparatus for an internal combustion engine, which comprises a bypass pipe for bypassing a portion of an exhaust pipe provided on the downstream side of a catalyst unit which is provided in the exhaust pipe of the engine; an absorption tube provided on the bypass pipe and filled with an absorbent; a first change-over valve provided at a location where the bypass pipe branches from the exhaust pipe for changing over the flow of an exhaust gas; a second change-over valve provided at a location where the bypass pipe joins the exhaust pipe for changing over the flow of the exhaust gas; a circulation path for connecting a position downstream of the absorption tube to a position upstream of the catalyst unit; a shut-off valve provided in the circulation path; and control means for opening the first and second change-over valves when the engine is in a cool state to introduce the exhaust gas into the bypass pipe, closing the first and second change-over valves when the engine is warmed up, and slightly opening the first change-over valve and opening the shut-off valve, each time circulation is enabled, to return desorbed HC to an intake pipe through the circulation path.

The present invention further provides an exhaust gas purification apparatus for an internal combustion engine, which comprises means for separating a portion of an exhaust pipe provided on the downstream side of a catalyst unit, which is provided in the exhaust pipe of an engine, into a main flow path and a sub-flow path; an absorption tube provided in the sub-flow path and filled with an absorbent; a bimetal valve provided on said separating means for changing over the flow of an exhaust gas; a circulation path for connecting a position downstream of the absorption tube to a position upstream of the catalyst unit; and a one-way valve provided in the circulation path for permitting a gas to flow only from the absorption tube to the catalyst unit, wherein when the engine is in a cool state, the exhaust gas is introduced from the sub-flow path to the exhaust pipe on the downstream stream thereof by actuating the bimetal valve and when the engine is warmed up, desorbed HC is returned to the upstream of the catalyst unit through the circulation path by actuating the bimetal valve.

The present invention further provides an exhaust gas purification apparatus for an internal combustion engine, which comprises means for separating a portion of an exhaust pipe provided on the downstream side of a catalyst unit, which is provided in the exhaust pipe of an engine, into a main flow path and a sub-flow path; an absorption tube provided in the sub-flow path and filled with an absorbent; a bimetal valve provided in said separating means for changing over the flow of an exhaust gas; a circulation path for connecting a position downstream of the absorption tube to the intake pipe of the engine; and a one-way valve provided in the circulation path for permitting a gas to flow only from the absorption tube to the catalyst unit, wherein when the engine is in a cool state, the exhaust gas is introduced from the sub-flow path to the exhaust pipe on the downstream stream side thereof by actuating the bimetal valve and when the engine is warmed up, desorbed HC is returned to the upstream of the catalyst unit through the circulation path by actuating the bimetal valve.

The present invention further provides an automobile exhaust gas purification apparatus, which comprises an exhaust path of an engine; a catalyst unit provided in the exhaust path; a bypass for connecting a position upstream of the exhaust path to a position downstream thereof on the downstream side of the catalyst unit; an absorbent provided in the bypass; a single change-over valve provided on the downstream end of the bypass for selectively opening/closing the bypass and the exhaust path; a circulation path for connecting a position of the bypass downstream of the absorbent to a portion just behind the exhaust valve of the exhaust manifold of the engine; a shut-off valve provided in the circulation path and capable of selecting a completely closed state and a checking state which permits opening only when the downstream side of the circulation path is at a low pressure; and a valve control means for controlling the actuation of the change-over valve and the shut-off valve.

The present invention further provides an automobile exhaust gas purification apparatus, which comprises a catalyst unit provided in an exhaust pipe of an engine; a honeycomb member provided in the exhaust pipe on the downstream side of the catalyst unit and having an absorbent carried by at least a half-cross-sectional portion of the honeycomb member for absorbing harmful components in an exhaust gas; a circulation flow pipe branching from the exhaust pipe for connecting the honeycomb member to the upstream side of the catalyst unit and having a one-way valve provided in the midway thereof; an exhaust-gas-flow-path change-over valve provided on the downstream side of the honeycomb member and capable of selectively changing over the flow path of the exhaust gas to the half-cross-sectional portion of the honeycomb member, which carries the absorbent, and the other half cross sectional portion thereof; and control means for controllably over the change-over valve to a position where the exhaust gas is caused to flow to the half-cross-sectional portion when the engine is in a cool state and a position where the exhaust gas is caused to flow to the other half-cross-sectional portion when the engine is warmed up.

DESCRIPTION OF PREFERRED EMBODIMENTS

Figure 1:
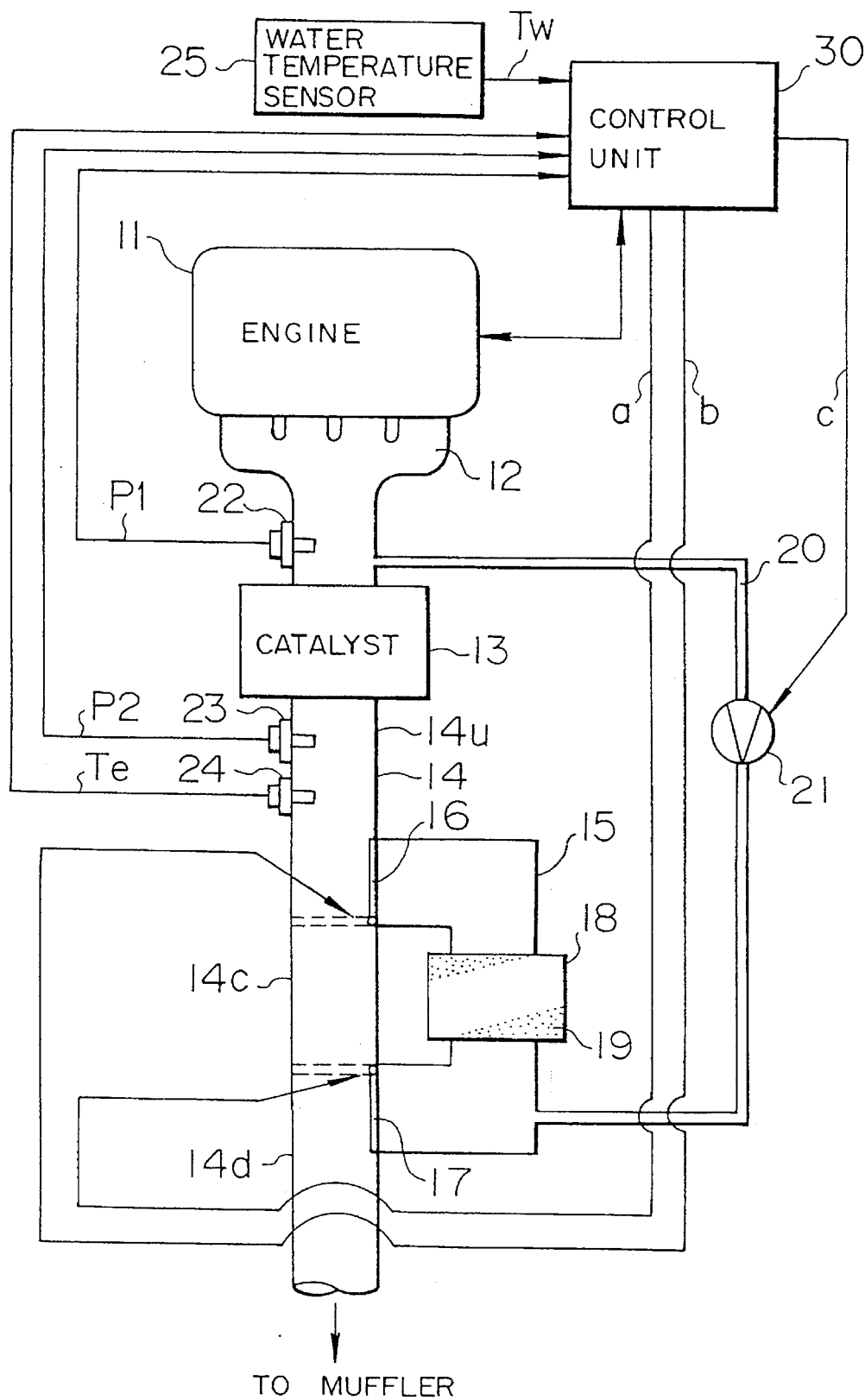
FIG. 1 is a view showing the overall arrangement of an exhaust gas purification apparatus for an internal combustion engine according to a first embodiment of the present invention.

A first embodiment of the present invention will be described below with reference to the drawings. FIG. 1 is a view showing the overall arrangement of an exhaust gas purification apparatus for, for example, an internal combustion engine.

In FIG. 1, the reference numeral 11 designates an engine having an exhaust port (not shown) connected to an end of a catalyst unit 13 through an exhaust manifold 12. The catalyst unit 13 purifies an exhaust gas by oxidizing HC and CO in the exhaust gas or reducing NOx therein. The catalyst unit 13 is activated when an exhaust gas is at a temperature of 400° C. or higher.

The other end of the catalyst unit 13 is connected to a muffler (not shown) through an exhaust pipe 14. A bypass pipe 15 is provided to bypass a section of the exhaust pipe 14. The bypass pipe 15 is connected to the exhaust pipe 14 at two connecting positions, i.e., an upstream connecting position and a downstream connecting position and the exhaust pipe located on the upstream side of the upstream connecting position is referred to as an upstream exhaust pipe 14u, the exhaust pipe located on the downstream side of the downstream connecting position is referred to as a downstream exhaust pipe 14d, and the exhaust pipe located between these two connecting positions is referred to as an exhaust pipe 14c.

Change-over valves 16, 17 are provided at the upstream and downstream connecting positions where the exhaust pipe 14 is connected to the bypass pipe 15, respectively, to change over the positions shown by solid lines (valve close positions) and the positions shown by dotted lines (valve open positions).

Further, an absorbent tube 18 is provided in the midway of the bypass pipe to absorb HC. The absorption tube 18 is filled with an absorbent 19 which is composed of, for example, activated charcoal, γ alumina, zeolite or the like. The absorption tube 18 has the characteristics that when an exhaust gas is at a temperature less than 200° C., it absorbs HC and when the exhaust gas is at a temperature from 200° C. to less than 400° C., it desorbes absorbed HC. It is to be noted that the temperature of the exhaust gas must be suppressed to less than 400° C. to protect the absorbent 19 filled in the absorption tube 18.

The bypass pipe 15 located on the downstream side of the absorbent tube 18 is connected to just the upstream side of the catalyst unit 13 through a circulation path 20. A one-way valve 21 is provided in the midway of the circulation path 20 to permit an exhaust gas to flow from the absorption tube 18 to the catalyst unit 13.

A first $O_2$ sensor 22 is provided on the upstream side of the catalyst unit 13, more strictly, in the exhaust manifold 12 located on the upstream side of the position where the circulation path 20 is connected to the exhaust manifold 12, and a second $O_2$ sensor 23 is provided in the exhaust pipe 14 located on the downstream side of the catalyst unit 13. The first $O_2$ sensor 22 is provided to enable the engine 11 to perform learning control of an air-fuel ratio when it is in a warming-up state, and second $O_2$ sensor 23 is provided to enable the engine 11 to perform learning control of an air-fuel ratio when it is in a cool state (e.g., when the engine is started).

Further, an exhaust gas temperature sensor 24 is provided on the downstream side of the second $O_2$ sensor 23 and on the upstream side of the upstream connecting position of the bypass pipe 15.

The aforesaid change-over valves 16, 17 are controllably opened/closed by actuators (not shown), respectively and a control unit 30 outputs control signals a, b to the actuators.

Further, the control unit 30 outputs an operation signal c to the one-way valve 21.

Further, voltages p1, p2 output from the first and second $O_2$ sensors 22, 23 are output to the control unit 30, respectively.

Further, the temperature Te of an exhaust gas sensed by the exhaust gas temperature sensor 24 and the temperature Tw of an engine cooling water sensed by a water temperature sensor 25, respectively, are output to the control unit 30. Incidentally, the control unit 30 is composed of a microcomputer and peripheral circuits thereof, and when the engine 11 is in the warming-up state, the control unit 30 performs learning control in a manner to take in the voltage p1 output from the first $O_2$ sensor 22, find an amount of deviation of an air/fuel ratio from a stoichiometric air/fuel ratio (about 14.7), find a learning value (correction coefficient) to correct the amount of deviation of the air/fuel ratio and to store the learning value. When the air/fuel ratio is equal to the stoichiometric air/fuel ratio, the learning value is "1.0".

In addition, when the engine is in the cool state, the control unit 30 performs learning control in a manner to take in the voltage p2 output from the second $O_2$ sensor 23, find an amount of deviation of the air/fuel ratio from the stoichiometric air/fuel ratio (about 14.7), find a learning value (correction coefficient) to correct the amount of deviation of the air/fuel ratio and to store the learning value. When the air/fuel ratio is equal to the stoichiometric air/fuel ratio, the learning value is "1.0".

Further, since the control unit 30 cannot correctly sense the theoretical air/fuel ratio when the first or second $O_2$ sensor 22, 23 is at a low temperature, the control unit 30 does not perform feedback control of the air/fuel ratio.

Further, the control unit 30 also has a function for sensing the operating state of the engine 11 and the timing at which the exhaust manifold 12 is subjected to a negative pressure. For example, the control unit 30 senses the timing, at which the exhaust manifold 12 is subjected to the negative pressure, from the map of the revolutions per minute of the engine and the degree of opening of a throttle.

Figure 2:
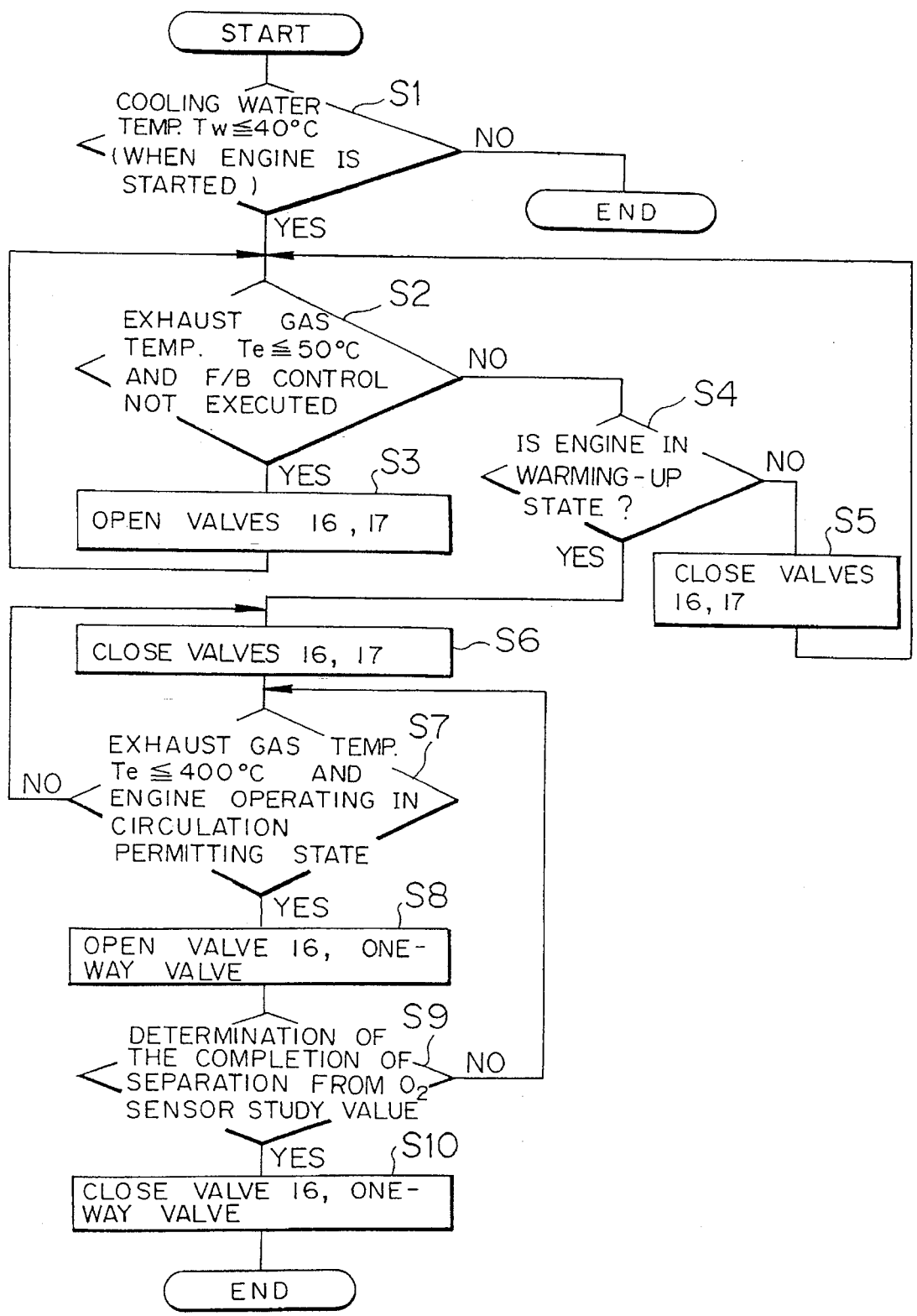
FIG. 2 is a flowchart showing the operation of the first embodiment.

Next, the operation of the first embodiment of the present invention as arranged as described above will be described with reference to FIG. 2. First, it is judged whether or not the temperature Tw of the engine cooling water is 40° C. or lower (step S1). The judgement at step S1 is "YES" in the event that the engine is started and then the judgement at step 2 is executed.

It is judged at step S2 whether or not the temperature Te of the exhaust gas sensed by the exhaust gas temperature sensor 24 is ≦50° C. and the feedback control of the air/fuel ratio is not executed. When the judgement at step S2 is "YES", the change-over valves 16, 17 are controlled to be brought to the valve open position (the positions of the dotted lines, step S3).

As a result, when the engine 11 is in the cool state, HC emitted therefrom passes through the catalyst unit 13 because the catalyst unit 13 is not activated, but the HC is absorbed by the absorbent 19 in the absorption tube 18 provided on the bypass pipe 15. The control of the change-over valves 16, 17 to the valve open position is executed while the judgement at step S2 is "YES".

Then, when a time elapses from the starting-up of the engine 11 and the temperature Te of the exhaust gas is increased and, for example, exceeds 50° C., the judgement at step S2 is "NO" and it goes to step S4 to judge whether or not the temperature Tw of the engine cooling water is higher than 40° C. That is, it is judged whether or not the engine 11 is in the warming-up state.

When the judgement at step S4 is "NO", the change-over valves 16, 17 are controlled to be brought to the valve close position (the positions of the solid lines) so that the exhaust gas does not flow to the bypass pipe 15 (step S5). Thereafter, the step S2 and the succeeding steps it are repeated. That is, when it is judged that the engine is not in the warming-up state, the change-over valves 16, 17 are closed and this state is kept until the judgement at step S4 is "YES", that is, the engine is in the warming-up state.

Incidentally, when the judgement at step S4 is "YES", that is, when it is judged that the engine 11 is in the warming-up state, the change-over valves 16, 17 are controlled to be brought to the valve close positions (the positions of the solid lines) so that the exhaust gas does not flow to the bypass pipe 15 (step S6).

Then, it is judged whether or not the temperature Te of the exhaust gas sensed by the exhaust gas temperature sensor 24 is 400° C. or lower and the operating state of engine permits the circulation of the exhaust gas (step S7). This operating state corresponds to the operating state of the engine in which the exhaust manifold is at a negative pressure and which is found from the map of the r.p.m of the engine and the degree of opening of the throttle.

When the judgement at step S7 is "YES", the change-over valve 16 located on the upstream side of the absorption tube 18 is slightly opened and the one-way valve 21 is opened (step S8). As a result, the desorption of the HC absorbed by the absorbent 19 is accelerated by the heat of the exhaust gas entering through the slightly opened change-over valve 16 and the desorbed HC is circulated to the exhaust manifold 12 through the one-way valve 21 by the suction force of the negative pressure in the exhaust manifold 12 and then purified by the catalyst unit 13.

Incidentally, since the desorbed HC is mixed with the exhaust gas, the air/fuel ratio of the exhaust gas shifts to a rich side. Then, learning control is performed such that a voltage output from the second $O_2$ sensor 23 is taken in, the deviation of the air/fuel ratio from the stoichiometric air/fuel ratio (about 14.7) is found, a learning value (correction coefficient) for correcting the deviation of the air/fuel ratio is found and is stored. Then, whether or not the HC absorbed to the absorbent 19 is entirely desorbed is judged by judging whether or not the learning value is "1.0" (step S9).

The aforesaid processing at step S7 is executed while the judgement at step S9 is "NO".

More specifically, the change-over valve 16 is slightly opened in the operating state in which the exhaust manifold 12 is at the negative pressure, and the HC absorbed by the absorbent 19 is desorbed and then circulated through the bypass pipe 20 and returned to the upstream of the catalyst unit 13 and purified by the catalyst unit 13.

When the judgement at step S9 is "YES", the change-over valve 16 and one-way valve 21 are closed to terminate a series of the processings.

It is to be noted that although the HC absorbed by the absorbent 19 is returned to the catalyst unit 13 by the processings at steps S7–S9, when the temperature Te of the exhaust gas exceeds 400° C. in this process, the change-over valve 16 is closed to prevent the absorbent 19 from being deteriorated by the heat of the exhaust gas. More specifically, the judgement at step S7 is "NO" and the processing at step S6 is executed.

As described above, in the first embodiment, since the change-over valves are changed over in the wide temperature range of from 50° C. to 400° C. and the HC absorbed by the absorbent 19 provided in the bypass pipe is returned to the upstream of the catalyst unit at the timing when the exhaust pipe is at the negative pressure, a temperature need not be finely controlled, and moreover the absorbed HC can be desorbed at an earlier timing.

Next, a second embodiment of the present invention will be described. While in the aforesaid first embodiment, HC absorbed by the absorbent 19 is returned to the catalyst unit 13 through the bypass pipe 20 and exhaust manifold 12, HC absorbed by the absorbent 19 is returned to an intake pipe in the second embodiment.

Figure 3:
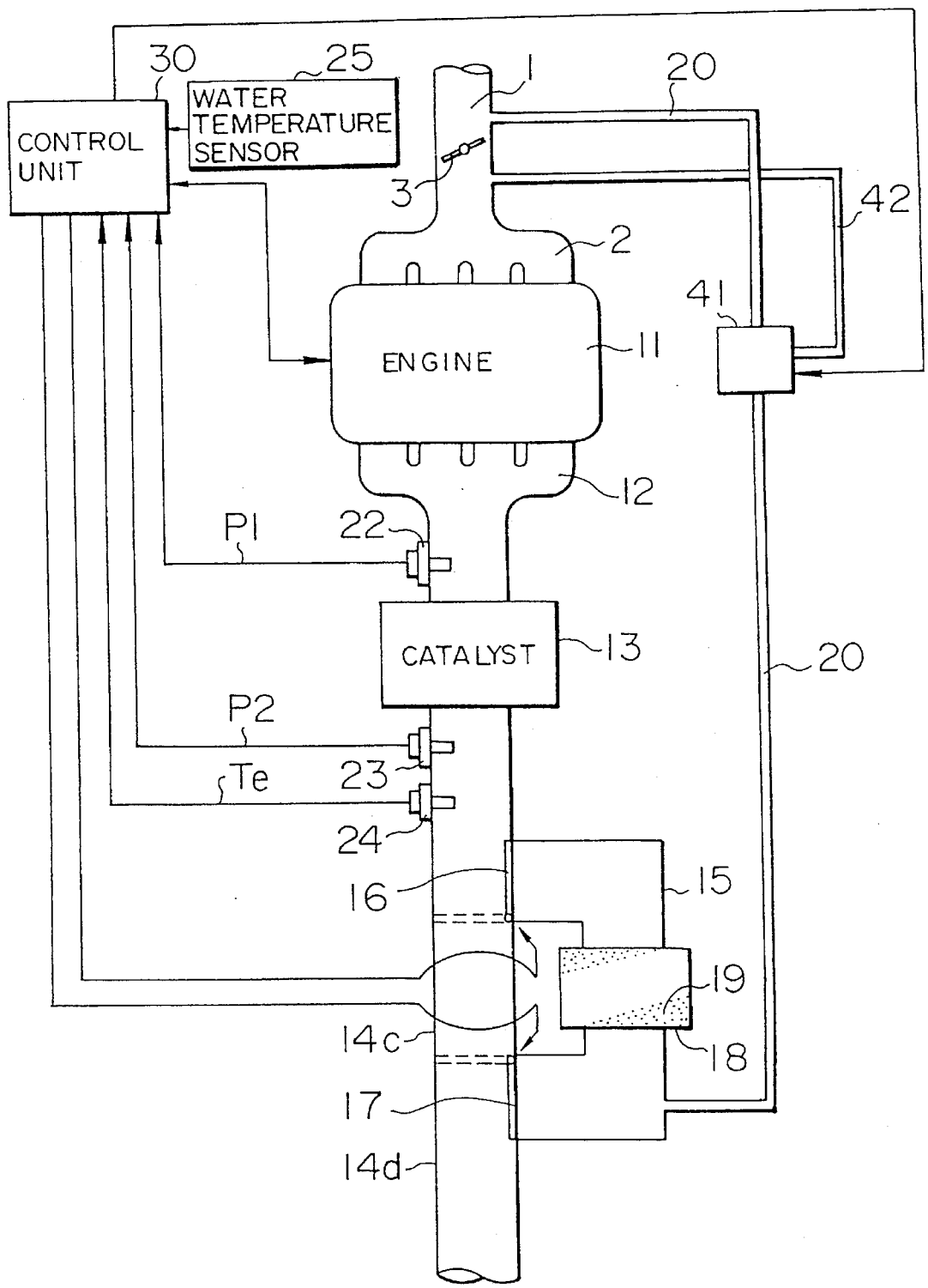
FIG. 3 is a view showing the overall arrangement of an exhaust gas purification apparatus for an internal combustion engine according to a second embodiment of the present invention.

The same reference numerals as used in FIG. 1 are used to designate the same parts in FIG. 3 and the detailed description thereof is omitted. In FIG. 3, an air cleaner (not shown) is connected to an engine 11 through an intake path 1 and an intake manifold 2. A throttle valve 3 is provided in the midway of the intake path 1.

A bypass pipe 15 located on the downstream side of an absorption tube 18 is connected to just the upstream side of a throttle valve through a shut-off valve 41 provided in the midway of a circulation path 20. A pressure just on the downstream side of the throttle valve 3 is introduced into the shut-off valve 41 through a pilot flow path 42.

In the second embodiment, a control unit 30 has a function for finding an amount of intake air on the basis of the r.p.m. of an engine 11 after the start thereof and the degree of opening of the throttle through a map, finding an amount of fuel to be injected in accordance with the amount of the intake air and calculating the amount of HC existing in an exhaust gas when the fuel is combusted.

Figure 4:
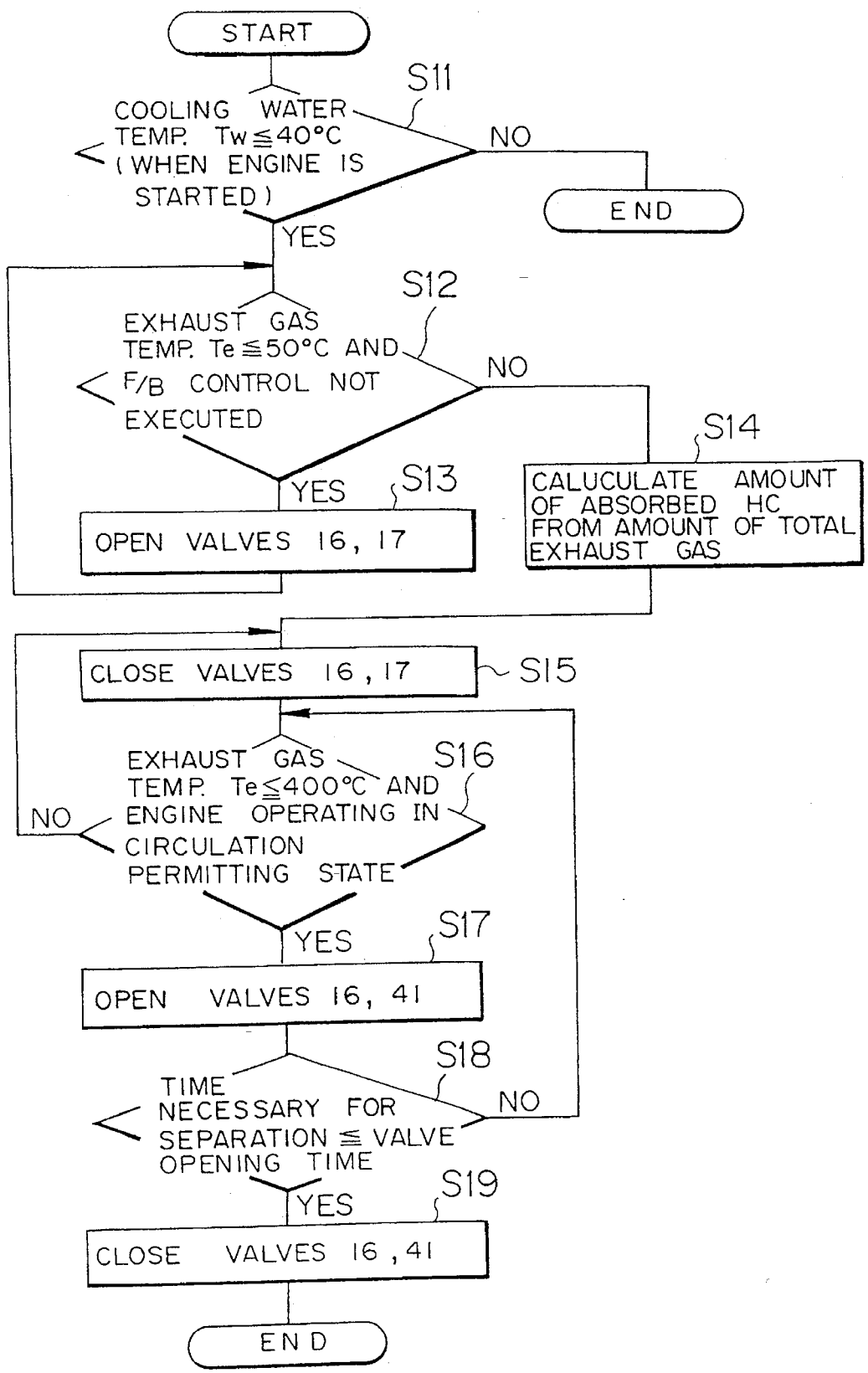
FIG. 4 is a flowchart showing the operation of the second embodiment.

Next, the operation of the second embodiment of the present invention arranged as described above will be described with reference to the flowchart of FIG. 4.

First, it is judged whether or not the temperature Tw of an engine cooling water is 40° C. or lower (step S11). The judgement at step S11 is "YES" in the event that the engine is started and then the judgement at step 12 is executed.

It is judged at step S12 whether or not the temperature Te of an exhaust gas sensed by an exhaust gas temperature sensor 24 is ≦50° C. and the feedback control of an air/fuel ratio is not executed. The judgement at step S12 is "YES", change-over valves 16, 17 are controlled to be brought to valve open positions (the positions of dotted lines, step S13).

As a result, HC emitted from the engine 11 when it is in a cool state passes through a catalyst unit 13 because it is not activated and the HC is absorbed by the absorbent 19 of an absorption tube 18 provided on a bypass pipe 15. The control of the change-over valves 16, 17 to the valve open positions is executed while the judgement at step S12 is "YES".

Then, when a time elapses from the start of the engine 11 and the temperature Te of the exhaust gas is increased and, for example, exceeds 50° C., the judgement at step S2 is "NO" and an amount of the HC absorbed by the absorbent 19 is calculated from the total amount of the exhaust gas (step S14). More specifically, the amount of intake air after the start of the engine 11 is found by the r.p.m. of the engine and the degree of opening of the throttle through a map, the amount of the fuel to be injected in correspondence with the amount of the intake air is found and the amount of HC existing in the exhaust gas when the fuel is combusted is found by calculation.

Then, the change-over valves 16, 17 are controlled to be brought to valve close positions (the positions of solid lines)

so that the exhaust gas does not flow to the bypass pipe 15 (step S15).

Then, it is judged whether or not the temperature Te of the exhaust gas sensed by an exhaust gas temperature sensor 24 is 400° C. or lower and the operating state of the engine permits the circulation of the exhaust gas (step S16).

When the judgement at step 16 is "YES", the change-over valve 16 located on the upstream side of the absorption tube 18 is slightly opened and the shut-off valve 41 is opened (step S17). As a result, the desorption of the HC absorbed by the absorbent 19 is accelerated by the heat of the exhaust gas entering through the slightly opened change-over valve 16 and the desorbed HC is circulated to the intake manifold 2 through the shut-off valve 41 by the suction force of the negative pressure in the intake manifold 2 and then combusted in the engine 11.

Then, a period of time required for the desorption is calculated from the amount of HC calculated at step S14 and the shut-off valve 41 is opened for the period of time required for the desorption. More specifically, it is judged at step S18 whether or not the period of time during which the shut-off valve 41 is opened is longer than the period of time required for the desorption.

Then, the processing at step S16 is executed while the judgement at step S18 is "NO".

More specifically, the change-over valve 16 is slightly opened in the operating state permitting the circulation of HC, and thus the HC absorbed by the absorbent 19 is desorbed and then circulated through the bypass pipe 20, returned to the intake manifold 2, combusted in the engine 11, and is purified by the catalyst unit 13.

If "YES" is the judgement in step S18, the change-over valve 16, as well as the shut-off valve 41, is closed, thus completing the series of processing.

It is to be noted that while the HC absorbed by the absorbent 19 is returned to the intake manifold 2 in the processings at steps S16–S18, the change-over valve 16 is closed to prevent the absorbent 19 from being deteriorated by the heat of the exhaust gas when the temperature Te of the exhaust gas exceeds 400° C. in the process. More specifically, the judgement at step S16 is "NO" and the processing at step S15 is executed.

As described above, in the second embodiment, since the change-over valves are changed over in the wide temperature range of from 50° C. to 400° C. and the HC absorbed by the absorbent 19 provided in the bypass pipe is returned to the intake pipe, a temperature need not be finely controlled and moreover the absorbed HC can be desorbed at an earlier timing.

Figure 5:
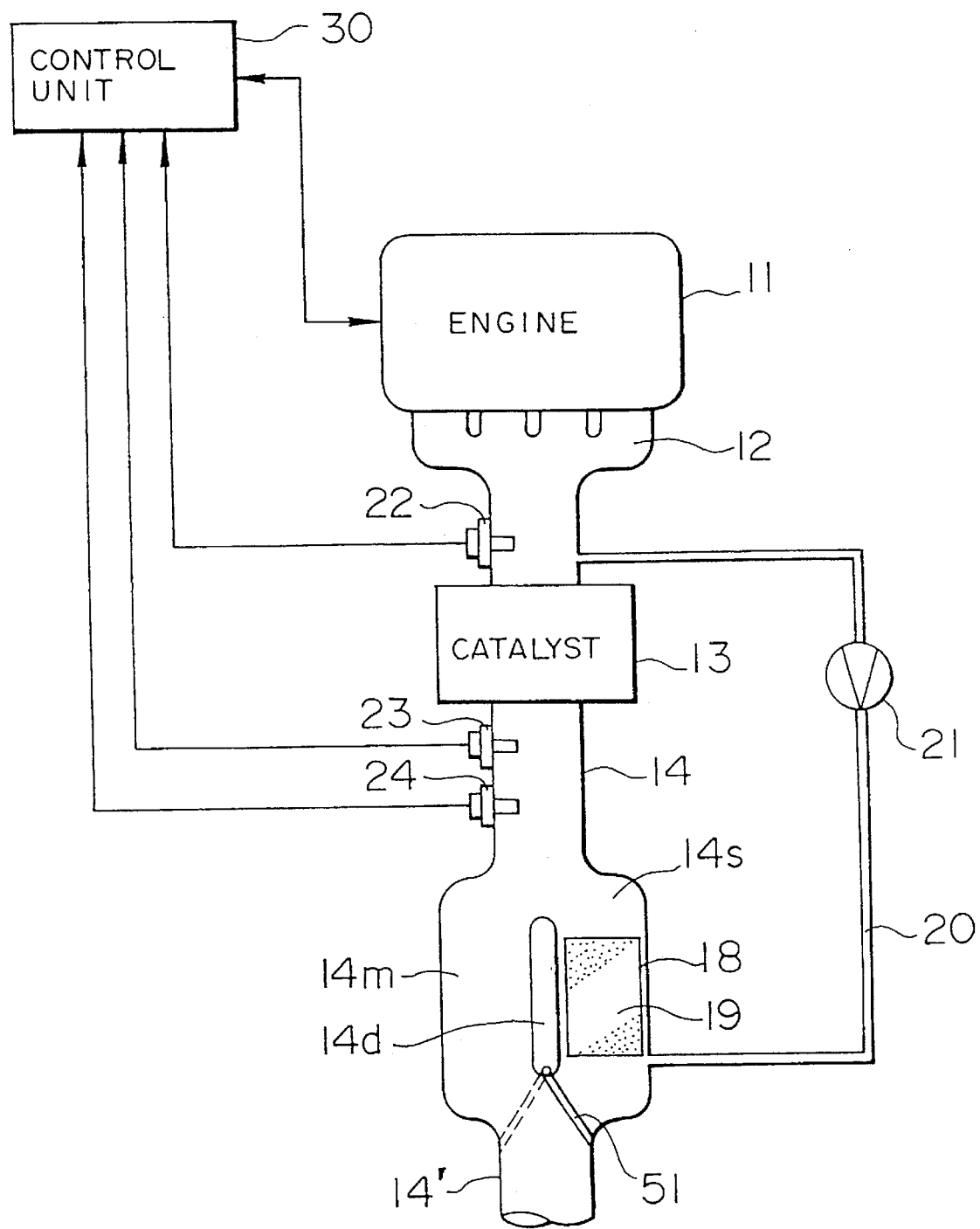
FIG. 5 is a view showing the overall arrangement of an exhaust gas purification apparatus for an internal combustion engine according to a third embodiment of the present invention.

A third embodiment of the present invention will be described with reference to FIG. 5. The third embodiment is such that HC absorbed by an absorbent 19 is returned to the upstream of a catalyst unit 13 in the same way as the aforesaid first embodiment, and the change-over valve 16 provided in the first embodiment shown in FIG. 1 is not provided. This arrangement is effective when an absorbent having a relatively excellent resistance to high temperature such as zeolite or the like is used as the absorbent 19. The same reference numerals as used in FIG. 1 are used to designate the same parts in FIG. 5 and the detailed description thereof is omitted. More specifically, an exhaust pipe 14 is branched to a main flow path 14m and a sub-flow path 14s in the midway thereof and thereafter these paths are joined and connected to an exhaust pipe 14'. A bimetal valve 51 is provided at the downstream end of the branch portion 14d where the main flow path 14m and sub-flow path 14 branch out and the position of the bimetal valve 51 is changed over between the position shown by a dotted line where the main flow path 14m is shut off and the position shown by a solid line where the sub-flow path 14s is shut off. The bimetal valve 51 is actuated to be brought to the position shown by the dotted line to absorb HC passing through a catalyst at a low temperature of, for example, 100° C. or lower and actuated to be brought to the position shown by the solid line at a temperature of 120° C. or higher to separate the HC, absorbed by the absorbent 19 by the heat of an exhaust gas and return the desorbed HC to the upstream of the catalyst unit 13 through a circulation path 20.

As described above, according to the third embodiment, the change over control of valves can be omitted by the use of the bimetal valve 51 and further HC can be securely absorbed and desorbed.

Figure 6:
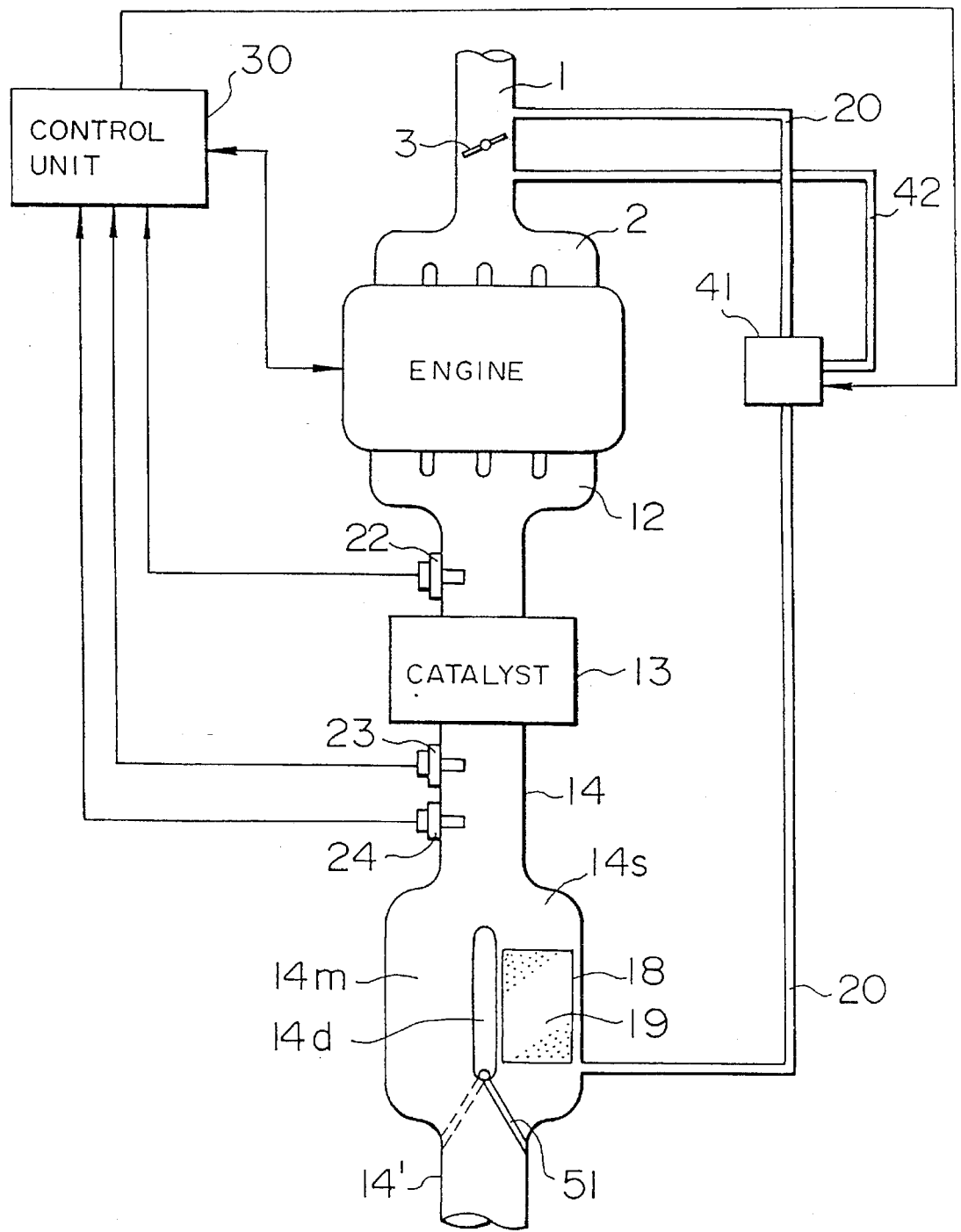
FIG. 6 is a view showing the overall arrangement of an exhaust gas purification apparatus for an internal combustion engine according to a fourth embodiment of the present invention.

Next, a fourth embodiment of the present invention will be described with reference to FIG. 6. The fourth embodiment is such that the circulation path 20 of the third embodiment is extended to lead to an intake path 1.

According to the fourth embodiment, the change-over control of valves is omitted by the use of a bimetal valve 51 and further HC can be securely absorbed and desorbed.

As described in detail with respect to the first to fourth embodiments, according to the present invention, an exhaust gas purification apparatus for an internal combustion engine can be provided in which HC absorbed by an absorbent can be quickly desorbed therefrom.

Figure 7:
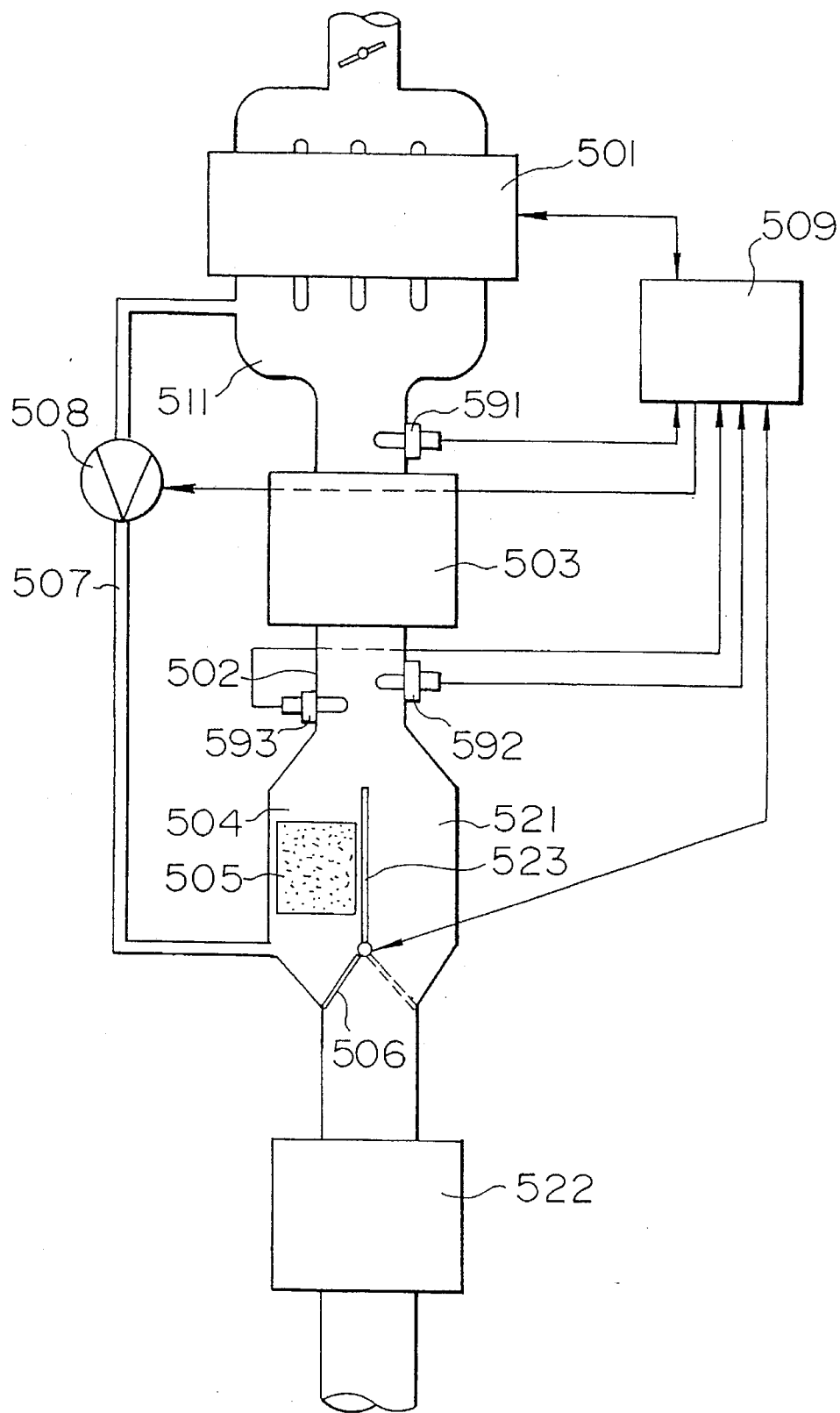
FIG. 7 is a schematic view showing the overall arrangement of an exhaust gas purification apparatus provided in an exhaust pipe of an automobile as a fifth embodiment of the present invention.

In a fifth embodiment shown in FIG. 7, a catalyst unit 503 is provided at a location where an exhaust manifold 511 of an engine 501 is connected to an exhaust pipe 502. The exhaust pipe 502 on the downstream side of the catalyst unit 503 has an enlarged-diameter portion in the midway thereof which extends past a muffler 522. The enlarged-diameter portion of the exhaust pipe 502 is partitioned into an exhaust main path 521 and a bypass 504 by a partition 523, and the bypass 504 is joined to the exhaust main path 521 at the upstream and downstream positions thereof.

A damper type change-over valve 506 is disposed at the downstream end of the partition 523, and the exhaust main path 521 is opened and the downstream opening of the bypass 504 is closed in the closed state shown in the figure, and the exhaust main path 521 is closed and the downstream opening of the bypass 504 is opened to constitute a portion of the exhaust pipe when the change-over valve 506 is opened as shown by the dotted line in the figure.

An absorbent 505 composed of zeolite or the like is provided in the midway of the bypass 504. The absorbent may be any of a pellet type, foam type, honeycomb type and the like.

An end of a circulation pipe 507 is connected to the side wall of the bypass 504 located on the downstream position of the absorbent 505 and the other end thereof is connected to the side wall of the exhaust manifold 511 just behind the exhaust gas valve (not shown) of a cylinder of an engine. A shut-off valve 508 is provided in the midway of the circulation pipe 507. The shut-off valve 508 incorporates an electromagnetic coil, and when the shut-off valve 508 is in an "open" state with the electromagnetic valve energized, the shut-off valve 508 acts as a check valve which is opened when the exhaust manifold 511 side is at a low pressure. When the electromagnetic coil is not energized, the shut-off valve 508 is maintained in an closed position.

$O_2$ sensors 591 and 592 are provided in the exhaust manifold 511 just on the upstream side of the catalyst unit 503 and in the exhaust pipe 502 just on the downstream side of the catalyst unit 503, respectively, and signals output from these O₂ sensors 591 and 592 are input to an electronic control unit (ECU) 509 which serves as a valve control means. When the ECU 509 executes the air/fuel control of the engine, it executes learning control in a warming-up state by the O₂ sensor 591 and learning control in a cool state by the O₂ sensor 592. The learning control serves to find an amount of deviation of an air/fuel ratio from the stoichiometric air/fuel ratio (about 14.7) and find a learning value (correction coefficient) for correcting the amount of the deviation. When the air/fuel ratio is equal to the stoichiometric air/fuel ratio, the learning value is "1.0". It is to be noted that when the O₂ sensors have a low temperature, the stoichiometric air/fuel ratio cannot be sensed and thus the feedback control (F/B) of the air/fuel ratio is not executed.

A temperature sensor 593 is provided at a location near the bypass 504 of the exhaust pipe 502 and a signal output therefrom is also input to the ECU 509. Signals of the temperature of engine cooling water and the like are also input to the ECU 509, which judges the operating state of the engine 501 on the basis of these signals as well as actuates the change-over valve 506 and shut-off valve 508 in the order described herein-below to thereby effect absorption and capture of the HC in an exhaust gas by the absorbent 505 and the desorption and purification thereof.

Figure 8:
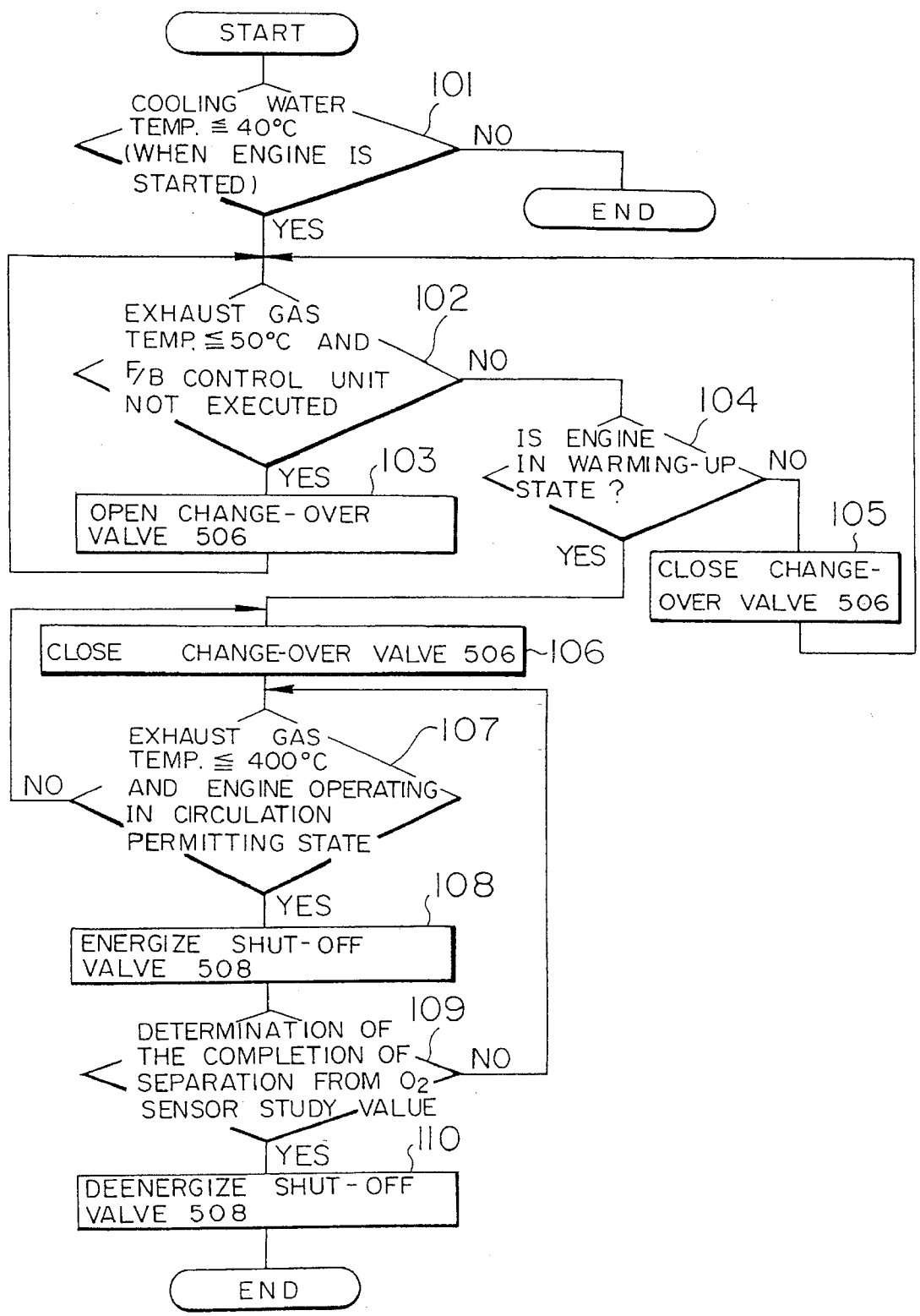
FIG. 8 is a flowchart of the operation of an electronic control unit.

FIG. 8 shows a sequence for capturing and purifying the HC by the ECU 509. When the temperature of the cooling water is 40° C. or lower, it is judged in step 101 that there is a possibility that uncombusted HC may be emitted, and step 102 and the succeeding steps are executed.

When it is confirmed at step 102 that the exhaust gas is at a temperature of 50° C. or lower and F/B control has not yet been performed on the air/fuel ratio, the change-over valve 506 is opened (step 103). With this operation, the bypass 504 is opened and the exhaust main path 521 is closed, and thus the exhaust gas containing HC from the engine 501 entirely flows to the bypass 504 to permit the absorbent 505 to capture the HC.

When the temperature of the exhaust gas exceeds 50° C., the absorbing capability of the absorbent 505 is deteriorated and when the feed back control is started, it is judged that the catalyst unit 503 is activated, and thus it goes to the next step 104 to confirm the warming-up state of the engine 501. When the engine 501 is not in the warming-up state, the change-over valve 506 is closed (step 105) to close the bypass 504 and the exhaust main path 521 is opened to stop the flow of the exhaust gas into the absorbent 505.

When the engine is in the warming-up state, the desorption of HC from the absorbent 505 and the purification thereof are started. More specifically, the change-over valve 506 is closed at step 106 and then the shut-off valve 508 is energized (step 108) after it is confirmed that the exhaust gas is at a temperature of 400° C. or lower and the engine 501 is in the operating state to permit the return of the HC (step 107). The operating state of the engine permitting the return of the HC is such that the internal pressure of the exhaust manifold 511 is negative, which can be found from the map of the r.p.m of the engine and the degree of opening of a throttle.

When the shut-off valve 508 is energized, it starts to act as a check valve and releases the pressure of the exhaust manifold just behind the exhaust gas valve of the engine when it is at a negative pressure. Thus, a part of the exhaust gas in the exhaust pipe 502 is sucked by the negative pressure to flow into the bypass 504 and causes the HC absorbed by the absorbent 505 to be desorbed therefrom by the heat thereof and to be returned into the exhaust manifold 511 through the circulation pipe 507.

HC returned to the exhaust manifold 511 flows into the activated catalyst unit 503 and is purified thereby. Since the desorbed HC is mixed with the exhaust gas, the air/fuel ratio of the exhaust gas shifts to a rich side and deviated from the stoichiometric air/fuel ratio. The ECU 509 stores the learning value (correction coefficient) for correcting the amount of deviation, and when the learning value is "1", it is judged that the separation and purification of the HC has been completed (step 109) and the shut-off valve 508 is deenergized (step 110).

As a result, when the engine starts, HC can be effectively captured and purified by the simple arrangement which is provided only with the change-over valve 506 and shut-off valve 508.

Figure 9:
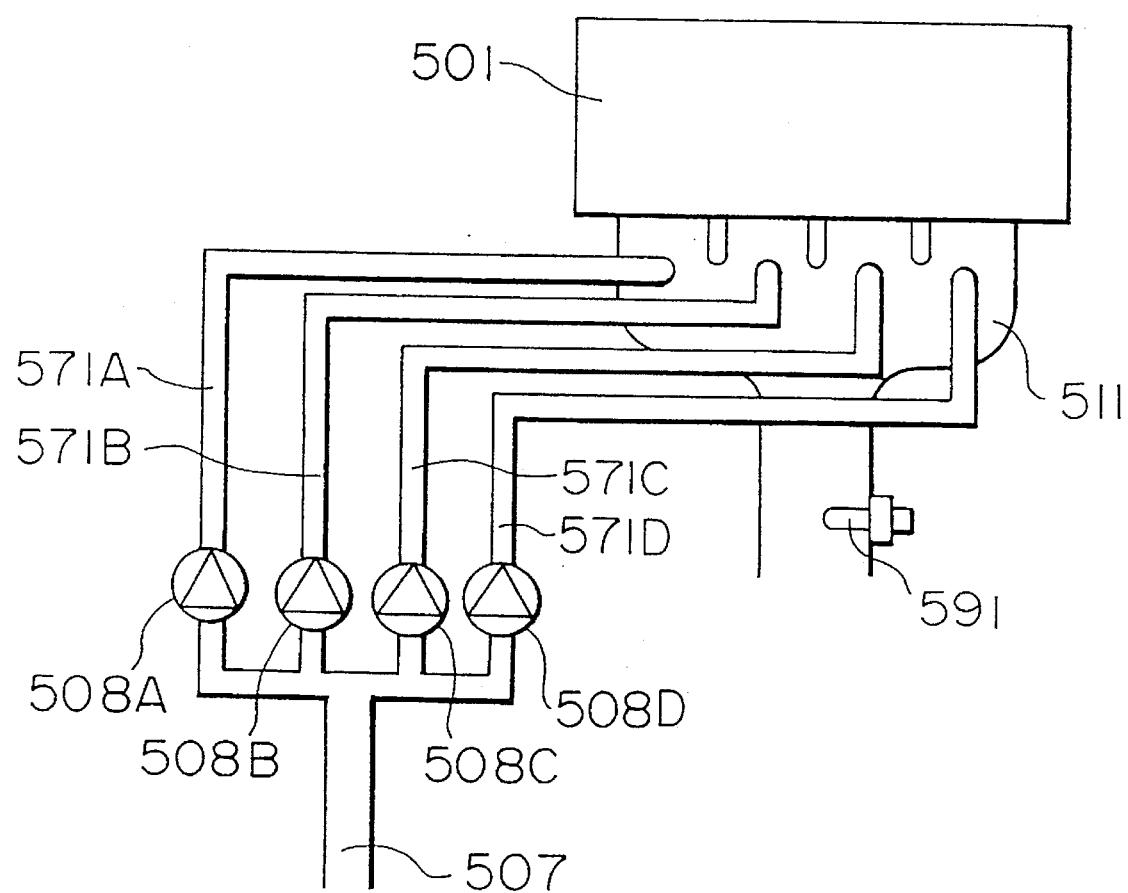
FIG. 9 is a schematic view showing the arrangement of the downstream portion of circulation pipes as a sixth embodiment of the present invention.

In a sixth embodiment of the present invention shown in FIG. 9, branch pipes 571A, 571B, 571C, 571D as many as the cylinders of an engine 501 are provided at the downstream end of a reflux pipe 507 and these branch pipes include shut-off valves 508A, 508B, 508C and 508D, respectively. The extreme ends of the branch pipes 571A–571D are opened to the wall of an exhaust manifold 511 located just behind the exhaust valves of the respective cylinders.

This arrangement also can achieve the same effect as that of the above embodiment. Further, since the exhaust strokes of the respective cylinders involve a time lag, the openings of the respective branch pipes 571A–571D have a negative pressure at a different timing, and thus any one of the shut-off valves 508A–508D is opened to cause HC to be continuously desorbed from an absorbent 505 and to be returned to the exhaust manifold 511.

As described above, in the exhaust gas purification apparatus for an automobile of the present invention, HC contained in an exhaust gas can be absorbed, desorbed and purified with a simple and less expensive structure.

Figure 10:
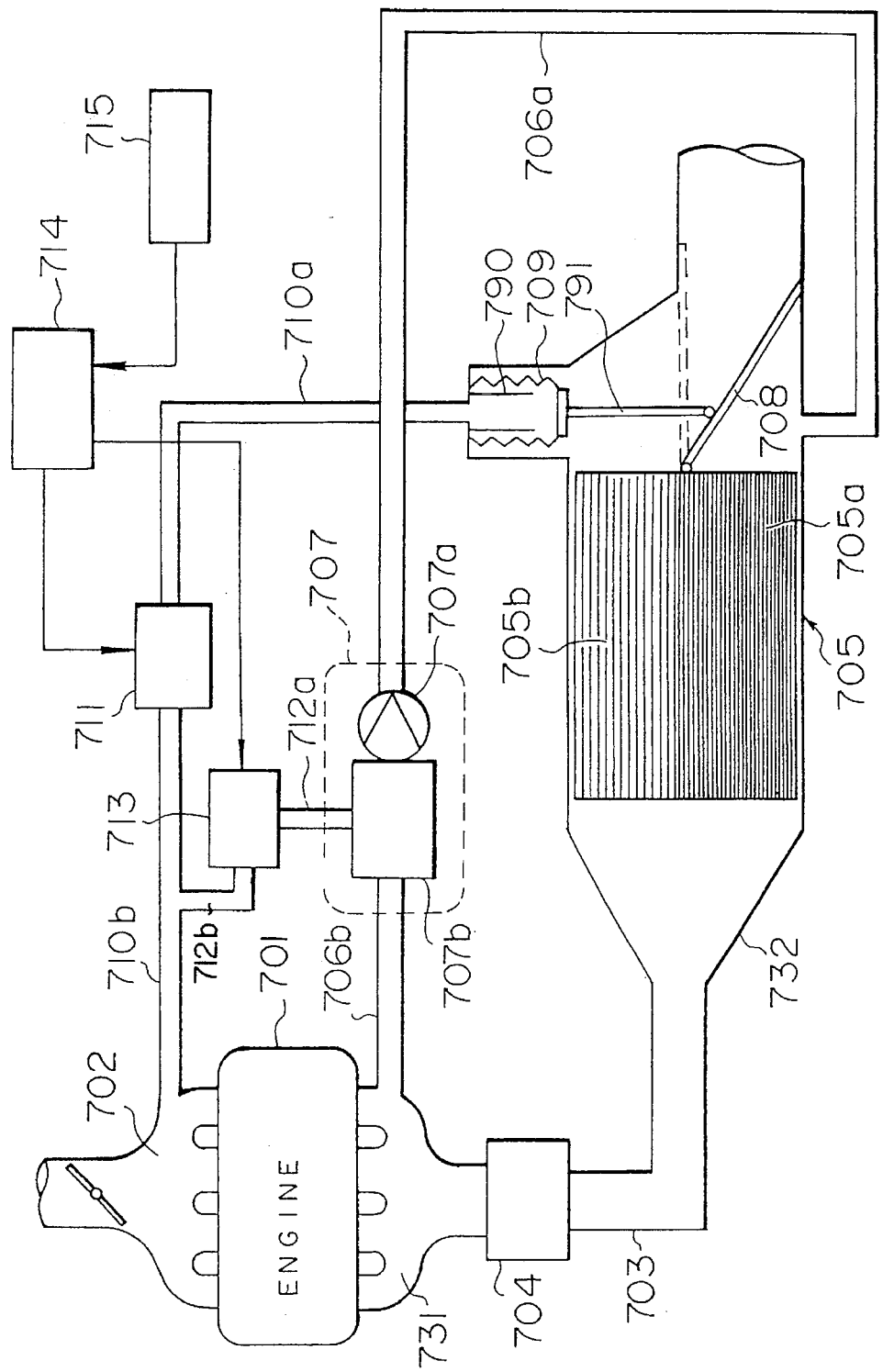
FIG. 10 is a view showing the arrangement of a seventh embodiment of an exhaust gas purification apparatus according to the present invention.
Figure 11:
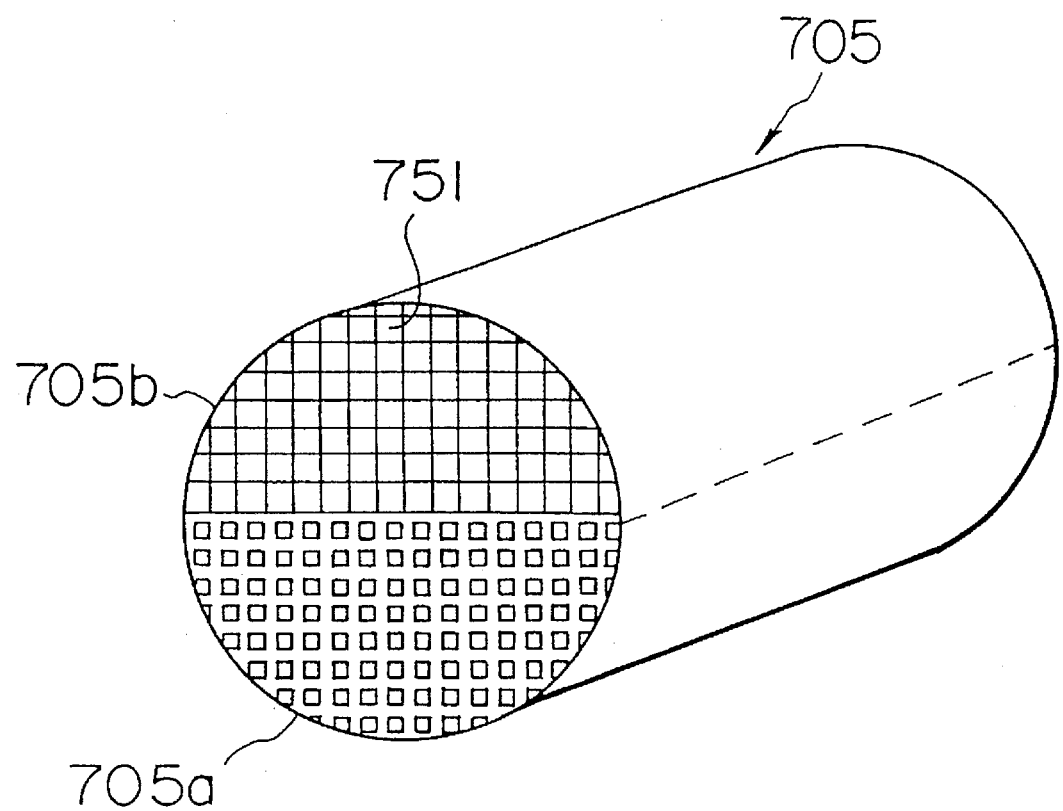
FIG. 11 is a perspective view of a honeycomb member carrying an absorbent in a half-cross-sectional portion thereof used in a seventh embodiment of the present invention.

In a seventh embodiment shown in FIG. 10, the exhaust pipe 703 of an engine 701 includes a catalyst unit 704 located just behind an exhaust manifold 731. A part of the exhaust pipe 703 behind the catalyst unit 704 comprises an enlarged-diameter portion 732 containing a honeycomb member 705 therein. The honeycomb member 705 composed of stainless steel or ceramics such as cordierite or the like has many parallel passing holes 751 as shown in FIG. 11, and a zeolite type absorbent is carried by the lower-half-cross-sectional portion 705a of cross-sectional portions 705a, 705b of the honeycomb member 705. An exhaust-gas-flow-path change-over valve 708 is provided just behind the rear end of the lower-half-cross-sectional portion 705a of the honeycomb member 705. A distance between the catalyst unit 704 and the honeycomb member 705 is set such that a timing at which the catalyst unit 704 is heated by an exhaust gas to reach an activating temperature substantially coincides with a timing at which the absorbent carried by the honeycomb member 705 is heated to lose its absorbing capability.

A circulation flow pipe 706a is branched from the exhaust pipe 703 toward the lower-half-cross-sectional portion 705a of the honeycomb member in the vicinity of the rear end of the honeycomb member 705 and is connected to a circulation flow path pipe 706b communicated with an exhaust manifold 731 through a reed valve 707 which comprises a one-way valve 707a and a shut-off valve 707b to be described below.

The exhaust pipe 703 is provided with a metal bellows 709 which is located on the upper-half-cross-sectional portion 705b side in the downstream of the honeycomb member 705, and the change-over valve 708 is connected to the bellows 709 through a shaft 791. The bellows 709 includes a stopper 790 to regulate the stroke thereof. The bellows 709 is communicated with a surge tank 702, which is located on the upstream side of the engine 701, through inlet pipes 710a, 710b through which a negative pressure is supplied to actuate the bellows 709. An electromagnetic valve 711 is interposed between the inlet pipes 710a, 710b.

The reed valve 707 includes the one-way valve 707a and shut-off valve 707b. The one-way valve 707a permits a fluid to flow only from the circulation flow pipe 706a. The shut-off valve 707b is actuated by a diaphragm or the like which is actuated by a negative pressure. The shut-off valve 707b is communicated with the inlet pipe 710b, through which the electromagnetic valve 711 is connected to the surge tank 702, through inlet pipes 712a, 712b for supplying a negative pressure to the shut-off valve 707b, and an electromagnetic valve 713 is provided between the inlet pipes 712a, 712b.

A control means 714 is incorporated in a microcomputer and receives signals from the engine 701 and an exhaust gas temperature sensor 715 to open/close the electromagnetic valves 711, 713 depending upon an operating state to thereby control the change-over valve 708 through the bellows 709.

Figure 12:
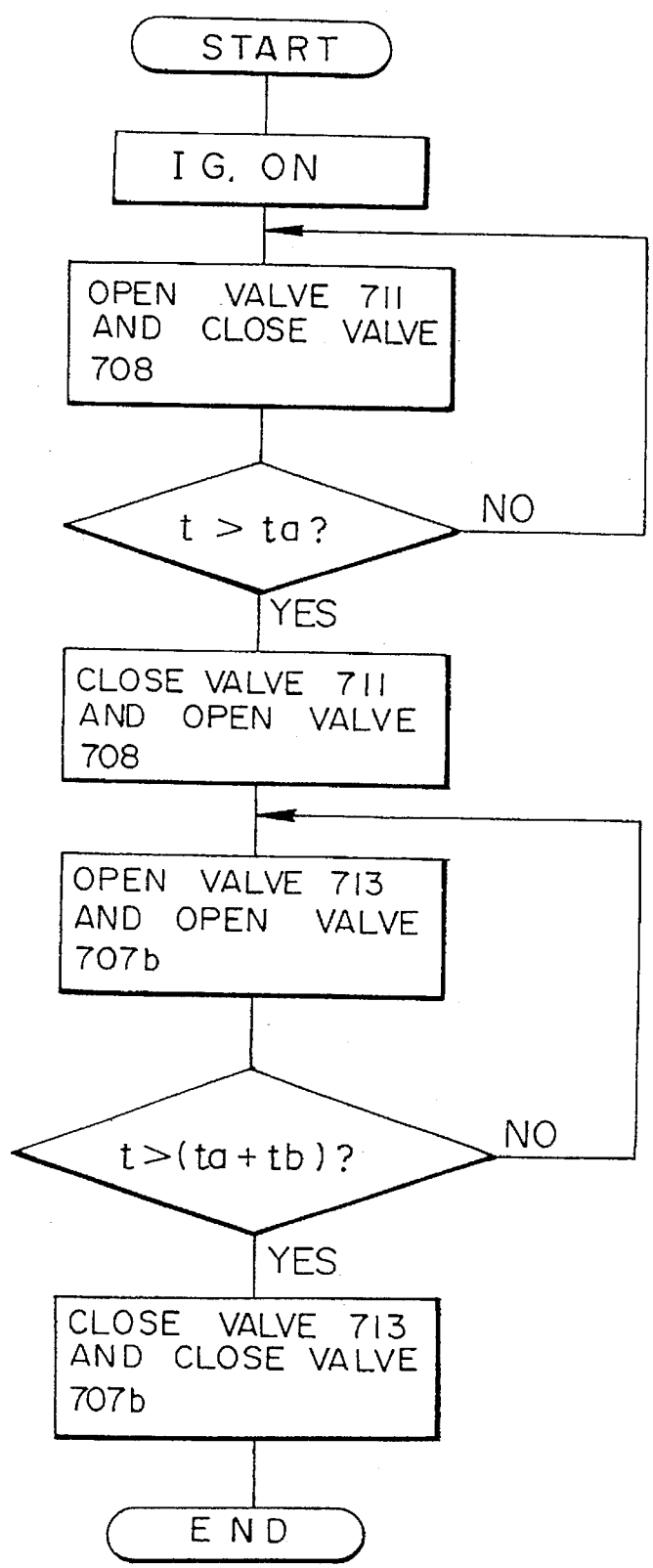
FIG. 12 is a flowchart showing the operation of the apparatus of the seventh embodiment.

Next, the operation of this apparatus will be described with reference to the flowcharts shown in FIGS. 10 and 12.

When the engine is started (IG ON), the electromagnetic valve 711 is opened by the control means 714 to cause the inlet pipe 710a to be communicated with the inlet pipe 710b. In this operation, the negative pressure in the surge tank 702 is applied to the bellows 709 through the inlet pipes 710a, 710b to contract it, and thus the change-over valve 708 is brought to the position shown by a dotted line (valve 708: closed).

An exhaust gas is at a low temperature just after the start of the engine 701 and the engine 701 discharges the exhaust gas containing a lot of cold HC. Since the catalyst does not reach an activating temperature while the exhaust gas is low in temperature, the cold HC is little purified by the catalyst unit 704 and flows into the exhaust pipe 703. At this time, the temperature of the exhaust gas is monitored by an exhaust gas temperature sensor 715.

Since the exhaust gas flows only through the lower-half-cross-sectional portion 705a of the honeycomb member 705 which contains the absorbent composed of zeolite, the cold HC is absorbed by the absorbent and the exhaust gas from which the cold HC is absorbed is discharged to the atmosphere through a muffler (not shown).

Upon the lapse of a predetermined period of time (ta), during which the engine 701 is warmed up and the temperature of the exhaust gas exceeds the temperature enabling the absorbent to absorb HC (t>ta), the electromagnetic valve 711 is closed in response to a signal from the control means 714 (valve 711: closed). Thus, the supply of the negative pressure to the bellows 709 is shut off, so that the bellows 709 returns to its original shape by the elastic force thereof and the change-over valve 708 is brought to a position shown by a solid line (valve 708: opened), and thus the exhaust gas is changed over in flow path to pass through the upper-half-cross-sectional portion 705b where the absorbent is not carried. At this time, the catalyst reaches the activating temperature, so that the cold HC in the exhaust gas is purified by the catalyst unit 704 and the exhaust gas containing little HC is discharged to the atmosphere through the upper-half-cross-sectional portion 705b.

Immediately after the electromagnetic valve 711 is closed, the electromagnetic valve 713 is opened in response to a signal from the control means 714 (valve 713: opened). Thus the inlet pipe 710b is communicated with the inlet pipe 712a and the negative pressure is supplied from the surge tank 702 to the shut-off valve 707b to open the same (valve 707b: opened).

On the other hand, the exhaust gas having risen in temperature flows through the upper-half-cross-sectional portion 705b of the honeycomb member 705 to heat the same and the heat of the upper-half-cross-sectional portion 705b is conducted to the lower-half-cross-sectional portion 705a formed integral therewith, so that the temperature of the absorbent rises to thereby accelerate the desorption of the HC.

At this time, since the shut-off valve 707b is opened as described above, the pulsation of the exhaust gas produced in the exhaust manifold 731 causes the one-way valve 707a to be intermittently opened through the circulation flow pipe 706b. Accordingly, the HC desorbed from the absorbent in the lower-half-cross-sectional portion 705a of the honeycomb member 705 flows into the exhaust manifold 731 through the circulation flow pipes 706a, 706b. Then, the desorbed HC is purified by the catalyst unit 704 together with the HC in the exhaust gas from the engine 701.

When a period of time (tb) during which the change-over valve 708 is changed over to the open position (shown by the solid line) and the HC desorption/purification process is started and then the desorption of the HC is completed has elapsed [t>(ta+tb)], the electromagnetic valve 713 and shut-off valve 707b are closed in response to a signal from the control means 714 (valves 713, 707b: closed).

While the absorbent is carried only by the lower-half-cross-sectional portion 705a of the honeycomb member 705 in the above embodiment, it may be carried by the entire honeycomb member 705. Further, that point of time, at which the change-over valve 708 is changed over toward the HC desorption/purification process (position shown by the solid line) by opening the electromagnetic valve 711 in response to the signal from the control means 714, may be a point of time at which the temperature of the exhaust gas reaches a predetermined high temperature.

Then, in this exhaust gas purification apparatus, the emission of cold HC can be prevented even when the engine is in a cold state before the catalyst reaches an activating temperature. Since the exhaust gas flow path 705a in which cold HC is absorbed by the absorbent and the main exhaust gas flow path 705b are formed by the partitioning of the integral honeycomb member 705, the absorbent is heated by the exhaust gas at a high temperature in the HC desorption/purification process to permit the HC to be effectively desorbed and purified. Further, since the desorbed HC is returned to the exhaust pipe 703 on the upstream side of the catalyst unit 704, the adverse effect on the control of the engine caused by the return of the HC can be reduced.

Figure 13:
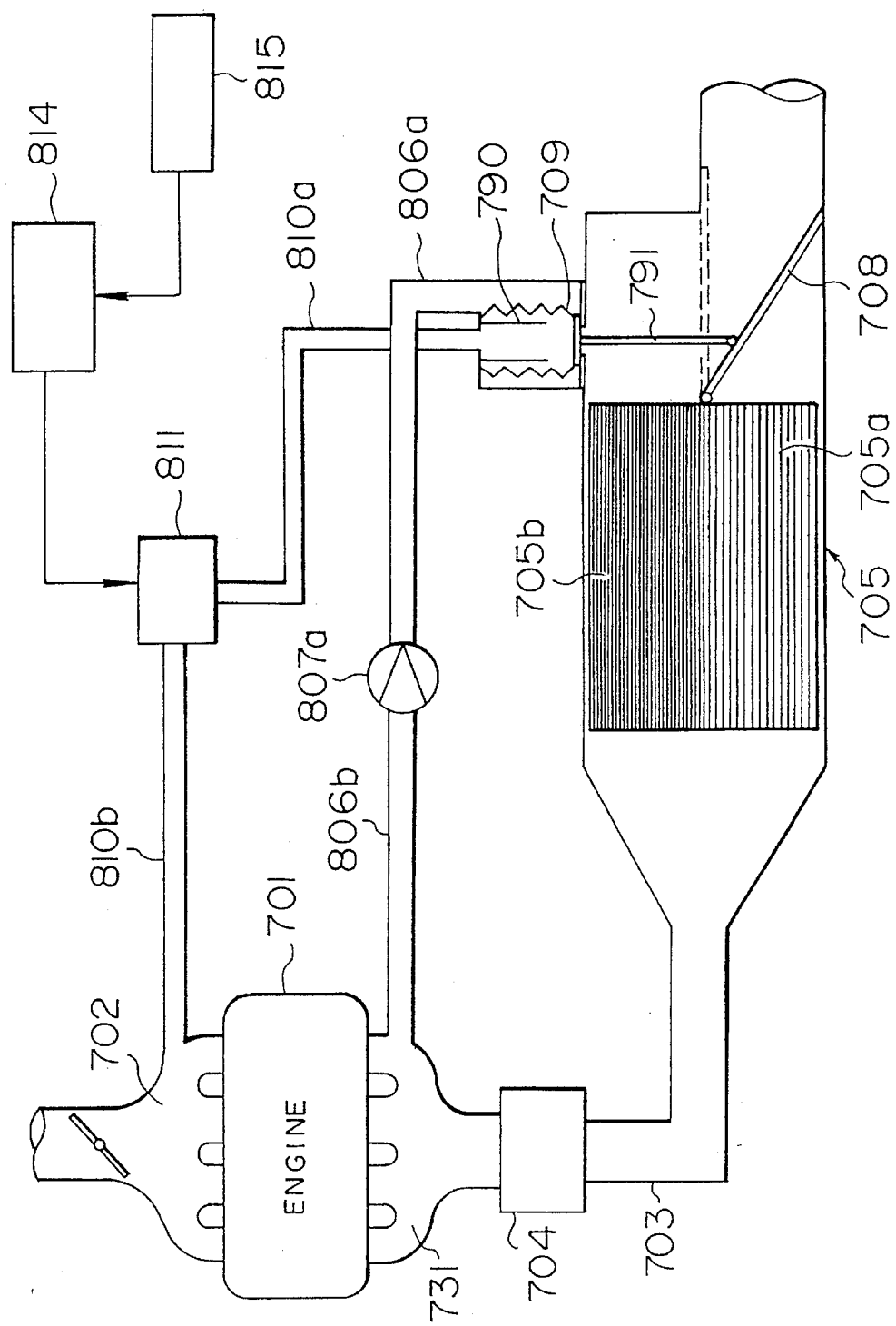
FIG. 13 is a view showing the arrangement of an eighth embodiment of an exhaust gas purification apparatus of the present invention.
Figure 14:
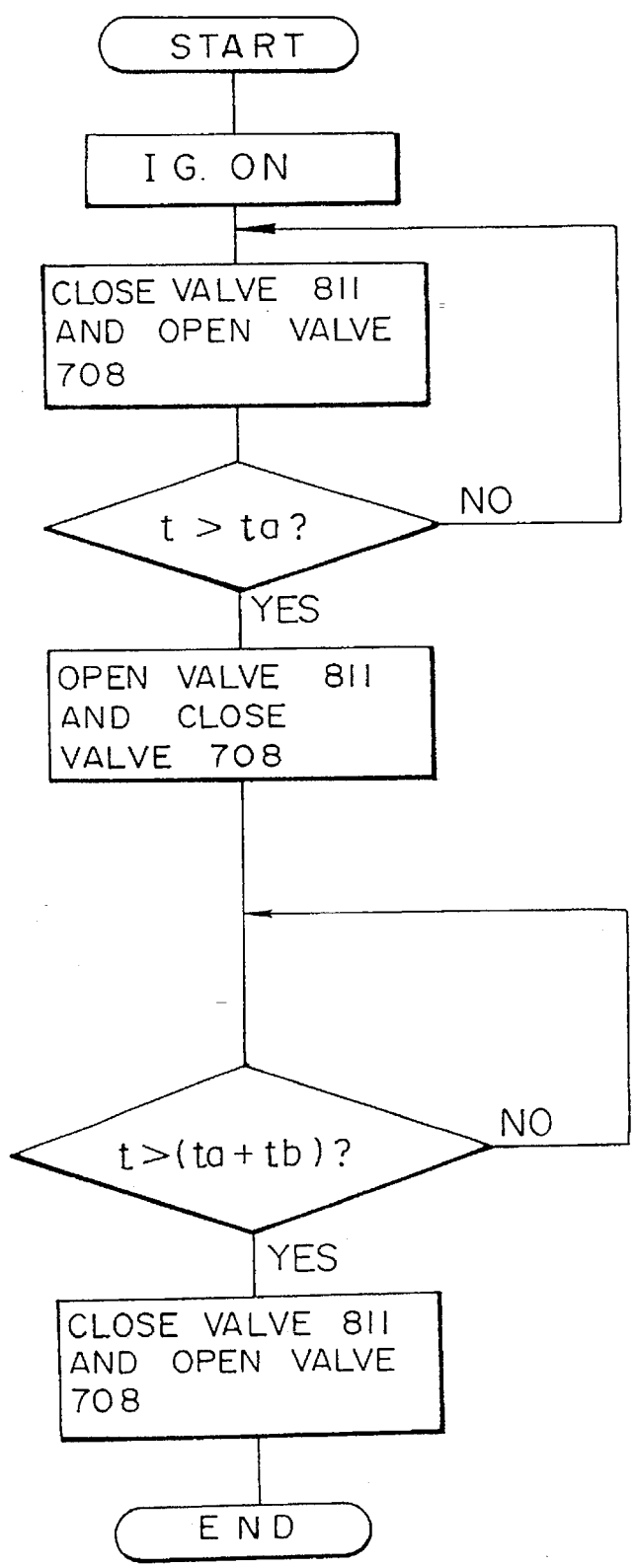
FIG. 14 is a flowchart showing the operation of the apparatus of the eighth embodiment.

An eighth embodiment of the present invention will be described with reference to the arrangement shown in FIG. 13 and the flowchart shown in FIG. 14, by putting a stress on the difference between this embodiment and the seventh embodiment.

A honeycomb member 705 including an absorbent carried by the upper-half-cross-sectional portion 705b thereof is provided in an exhaust pipe 703 on the downstream side of a catalyst unit 704. A change-over valve 708 is provided on the downstream side of the honeycomb member 705 for selectively changing over the flow path of an exhaust gas to the upper-half-cross-sectional portion 705b of the honeycomb member 705 carrying the absorbent and the lower-half-cross-sectional portion 705a thereof. A bellows 709 connected to the change-over valve 708 through a shaft 791 for driving the valve 708 is connected to the surge tank 702 of an engine 701 through inlet pipes 810a, 810b and an electromagnetic valve 811 is interposed between the inlet pipes 810a, 810b, in a manner similar to the seventh embodiment. A one-way valve 807a is interposed between circulation flow paths 806a, 806b for circulating HC desorbed from the absorbent to an exhaust manifold 731. The circulation flow path 806a is connected to the exhaust pipe 703 from the bellows 709 side so that it is connected to and shut off from the exhaust pipe 703 by the actuation of the bellows 709. A control means 814 is connected to an exhaust gas temperature sensor 815 and an electromagnetic valve 811.

Prior to the start of the engine 701, the change-over valve 708 is at an open position by the elastic force of the bellows 709 and the electromagnetic valve 811 is opened.

When the engine 701 is started, the exhaust gas passes the upper-half-cross-sectional portion 705b, which carries the absorbent 705, through the catalyst unit 704 to permit the cold HC in the exhaust gas to be absorbed by the absorbent. When a predetermined period of time (ta) has elapsed after the start of the engine, the electromagnetic valve 811 is opened in response to a signal from the control means 814 and the bellows 709 is contracted by the negative pressure from the surge tank 702 to cause the change-over valve 708 to be changed over to the close position shown by a dotted line. Thus the exhaust gas having HC therein purified by the catalyst 704 which has been heated to a high temperature and activated flows through the lower-half-cross-sectional portion 705a of the honeycomb member 705.

On the other hand, since the inlet pipe 806a is opened, the pulsation of the exhaust manifold 731 causes the one-way valve 807a to be intermittently opened. Then, the HC desorbed from the absorbent heated to the high temperature is returned to the exhaust manifold 731 through the circulation flow pipes 806a, 806b by the above pulsation to be purified by the catalyst 704.

After a period of time [t>(ta+tb)] during which the HC is completely desorbed after the opening of the electromagnetic valve 811 has elapsed, the electromagnetic valve 811 is closed in response to a signal from the control means 814, and thus the change-over valve 708 is brought to an opened position (position shown by a solid line), so that the exhaust gas flows through the upper-half-cross-sectional portion 705b of the honeycomb member 705, from which the HC is desorbed, and is exhausted.

This embodiment is advantageous in that the number of valves can be reduced and piping can be simplified as compared with the seventh embodiment while it achieves the same effect as that of the seventh embodiment.

While the honeycomb member 705 having the absorbent carried by the-half-cross-sectional portion thereof is provided on the downstream side of the catalyst unit 704 in any one of the above embodiments, a honeycomb member having an absorbent carried by one of the half- cross-sectional portions thereof and a catalyst carried by the other half-cross-sectional portion may be used in place of the honeycomb member 705.

Figure 15:
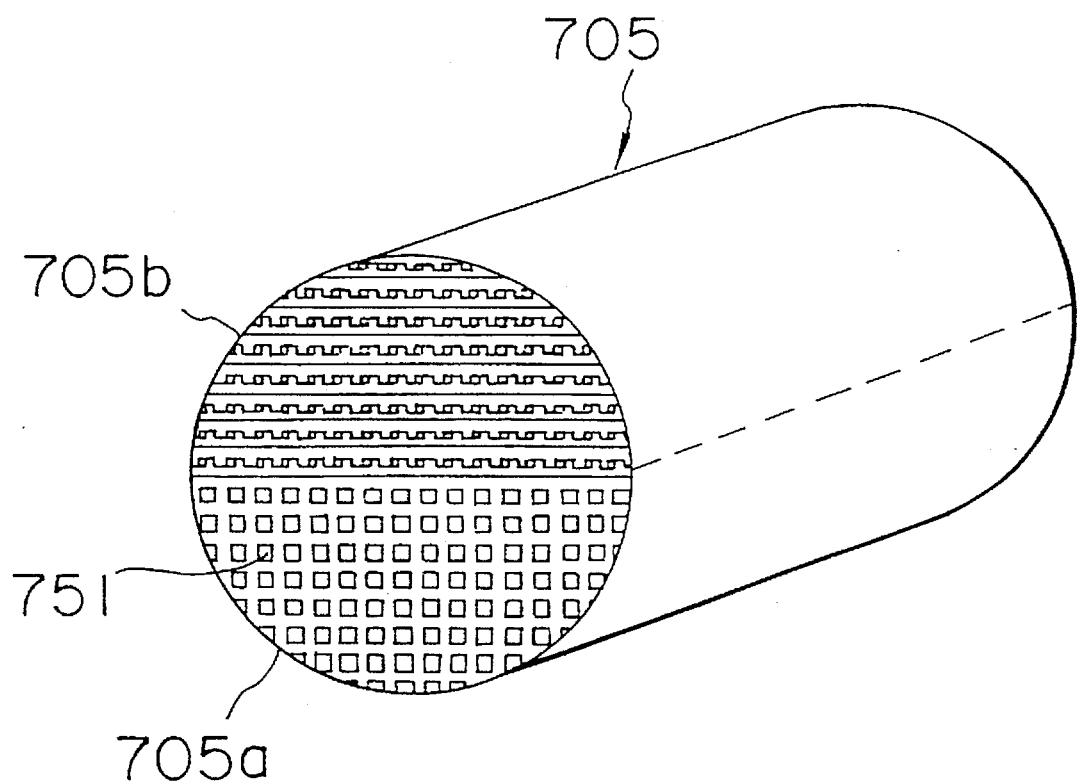
FIG. 15 is a perspective diagram of a honeycomb member carrying an absorbent in one half-cross-sectional portion thereof and a catalyst in the other half-cross-sectional portion thereof.
Figure 16:
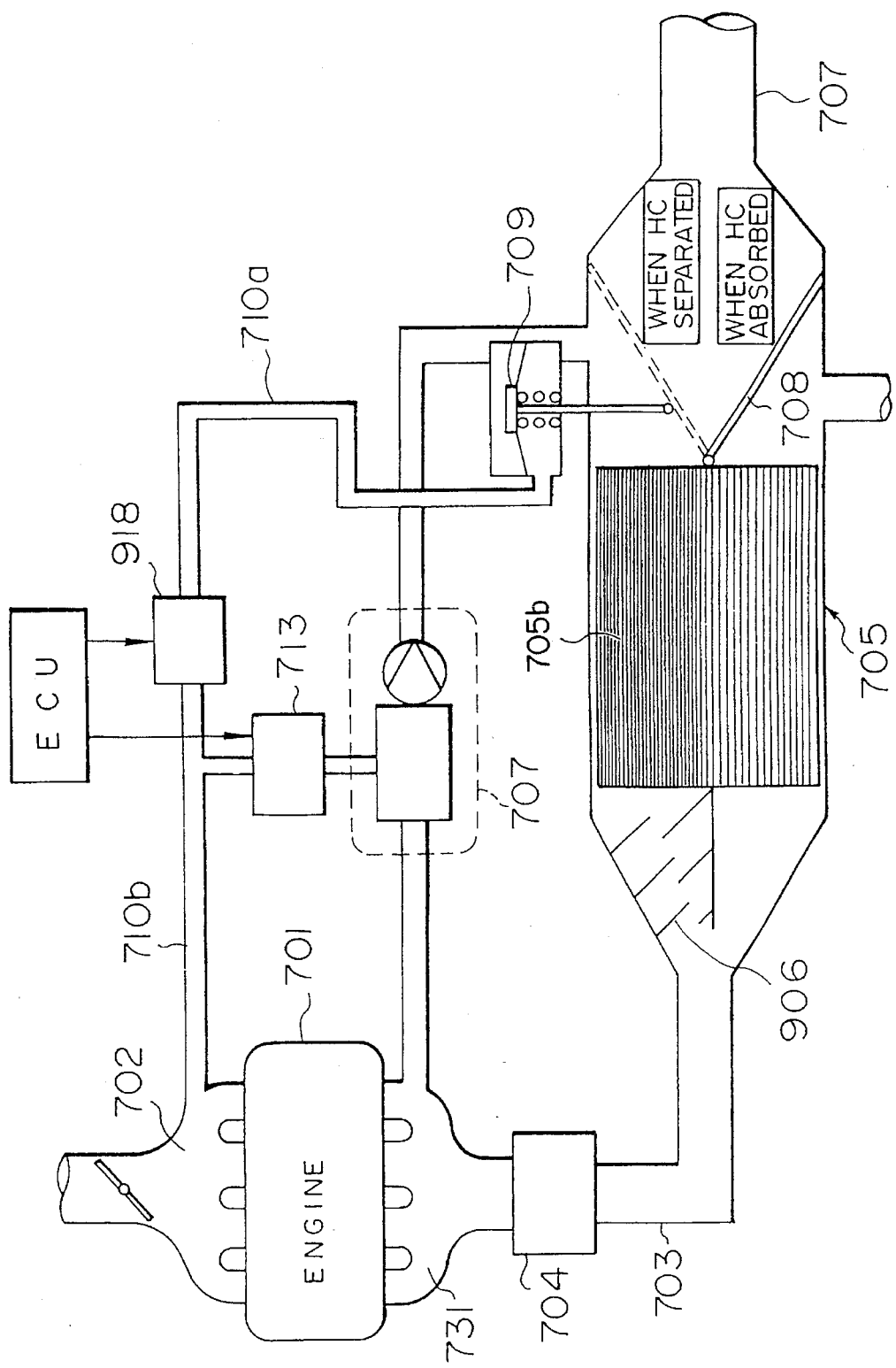
FIG. 16 is a view showing the arrangement of a ninth embodiment of an exhaust gas purification apparatus according to the present invention.

A honeycomb member 705 shown by FIG. 15 has an absorbent carried by the lower-half-cross-sectional portion 705a thereof and a catalyst carried by the upper-half cross-sectional portion 705b thereof. When this honeycomb member 705 is applied to the apparatus of the seventh embodiment shown in FIG. 10, an exhaust gas flows through the lower-half-cross-sectional portion 705a, which carries the absorbent, at low temperatures until the temperature of the catalyst reaches the temperature for activating it, and after the temperature of the catalyst reaches the activating temperature, the exhaust gas flows through the upper-half-cross-sectional portion 705b.

This embodiment has the following advantages relative to the aforesaid embodiments. That is, when a high load is applied to the engine after the temperature of an exhaust gas reaches the activating temperature of the catalyst, the exhaust gas may flow in an increased amount to an extent that the catalyst unit located on the upstream side can not perfectly purify the HC contained in the exhaust gas. According to this embodiment, however, in that event that the unpurified HC can be purified by the upper-half-cross-sectional portion 705b of the honeycomb member 705 which carries the catalyst. With the arrangement of the honeycomb member 705 serving as an absorbing unit and a catalyst unit as described above, HC can be more perfectly purified.

Further, when the exhaust gas flows through the upper-half-cross-sectional portion 705b of the honeycomb member 705, an effect can be also obtained in that the reaction heat of the catalyst is added to the heat conducted to the lower-half-cross-sectional portion 705a, which absorbs HC, to further promote the desorption of the HC.

The exhaust gas purification apparatus of the present invention can prevent the emission of HC even while the engine is in a cold state before the catalyst reaches the activating temperature. Further, the absorbent can effectively absorbs HC and the HC can be effectively desorbed from the absorbent and purified, and an adverse effect on the control of the engine caused by the purification of the HC can be minimized as far as possible.

In a ninth embodiment of the present invention, a gasoline fine particle removing unit 906 in the form of a baffle plate is provided on the upstream side of the upper-half-cross-sectional portion 705b of the honeycomb member shown in FIG. 15.

Conventionally, gasoline fine particles contained in an exhaust gas cannot be adequately absorbed by the absorbent of a honeycomb member because the size of the particles is too large. The provision of the gasoline fine particle removing unit 906, however, causes gasoline fine particles to strike against the removing unit 906, whereby they can be removed for the first time without being directly discharged to the outside.

What is claimed is:

1. An apparatus for purifying an exhaust gas emitted from an internal combustion engine having an exhaust gas flow path, the apparatus comprising:

a catalyst unit provided in an exhaust gas flow path;

a bypass passage having first and second ends, each in communication with the exhaust gas flow path downstream of said catalyst unit;

an absorbent provided in said bypass passage for absorbing a hydrocarbon ("HC") gas contained in an exhaust gas emitted from an internal combustion engine:

a circulation passage having first and second ends, said first end being connected to a location in the exhaust gas flow path upstream of said catalyst unit, and said second end being connected to said bypass passage, downstream of said absorbent;

a circulation controlling means provided in said circulation passage for intermittently opening and closing said circulation passage in correspondence with an exhaust gas pulsation occurring at said location in the exhaust gas flow path upstream of said catalyst unit where said first end of said circulation passage is connected;

exhaust gas flow path change-over means for directing the exhaust gas to flow through said bypass passage when a temperature of said exhaust gas is lower than a threshold temperature, and for directing the exhaust gas to flow only in the exhaust gas flow path when a temperature of the exhaust gas is higher than the threshold temperature.

2. An apparatus according to claim 1, wherein said exhaust gas flow path change-over means is disposed only downstream of said absorbent.

3. An apparatus according to claim 1, wherein said absorbent is temperature-sensitive.

4. An apparatus according to claim 1, wherein said circulation controlling means comprises a one-way valve, said one-way valve being operable in accordance with a pressure in said exhaust gas flow path such that said one-way valve is opened when the exhaust gas flow path is put under negative pressure.

5. An apparatus according to claim 1, wherein said location in the exhaust gas flow path upstream of said catalyst unit is an exhaust manifold of the internal combustion engine.

* * * * *